United States Patent
Yamashita et al.

(10) Patent No.: US 6,786,848 B2
(45) Date of Patent: Sep. 7, 2004

(54) EXERCISE ASSISTING METHOD AND APPARATUS IMPLEMENTING SUCH METHOD

(75) Inventors: Akihisa Yamashita, Kobe (JP); Shin Terao, Kobe (JP); Shintaro Ohsato, Kobe (JP)

(73) Assignee: Konami Sports Life Corporation, Tokyo (JP)

( * ) Notice: Subject to any disclaimer, the term of this patent is extended or adjusted under 35 U.S.C. 154(b) by 40 days.

(21) Appl. No.: 10/236,380

(22) Filed: Sep. 5, 2002

(65) Prior Publication Data

US 2003/0064860 A1 Apr. 3, 2003

(30) Foreign Application Priority Data

Sep. 28, 2001 (JP) ........................................ 2001-304332

(51) Int. Cl.[7] .............................................. A63B 21/00
(52) U.S. Cl. ................................ 482/8; 482/9; 482/900
(58) Field of Search .......................... 482/1–9, 900–902

(56) References Cited

U.S. PATENT DOCUMENTS 4,278,095 A 7/1981 Lapeyre
RE34,728 E * 9/1994 Hall-Tipping ................. 463/23
5,591,104 A 1/1997 Andrus et al.
5,667,459 A * 9/1997 Su ................................. 482/4
6,142,913 A 11/2000 Ewert
6,572,511 B1 * 6/2003 Volpe ............................ 482/4

FOREIGN PATENT DOCUMENTS

EP 0 255 621 2/1988
EP 0 569 879 11/1993

* cited by examiner

*Primary Examiner*—Glenn E. Richman
(74) *Attorney, Agent, or Firm*—Jordan and Hamburg LLP

(57) ABSTRACT

An exercise assisting apparatus including a cycling machine, a rotation sensor for detecting pedaling movement of the cycling machine, a pulse sensor for detecting the pulse rate of the user, an exercise monitoring unit for monitoring the pulse rate of the user based on the detection results of the rotation sensor and the pulse sensor and a monitor for displaying a background image and a role-playing character. The apparatus also includes an image processor for causing the role-playing character to make a simulated motion related to the pedaling movement within the background image on the monitor based on the detection result of the rotation sensor, a game executing unit for causing the roll-playing character to jump, and a game evaluating unit for giving a higher evaluation when a landing position after the jump is closer to the position reached when the jump is made at a preset target pulse rate.

16 Claims, 26 Drawing Sheets

EXERCISE ASSISTING METHOD AND APPARATUS IMPLEMENTING SUCH METHOD

BACKGROUND OF THE INVENTION (1) Field of the Invention

The present invention relates to an exercise assisting apparatus provided with an exercising equipment having a movable portion for causing a user to exercise in a specified load condition, an exercise detecting means for detecting a movement of the movable portion of the exercising equipment, a pulse rate detecting means for detecting the pulse rate of the user, and an exercise monitoring means for monitoring an exercising state of the user based on the detection results of the exercise detecting means and the pulse rate detecting means, and also to an exercise assisting method.

(2) Description of the Related Art

There have been conventionally proposed such exercise assessing apparatuses that a monitor is provided on the front side of a stationary cycling machine, a character simulating an exercising state and a scenery as a background image are displayed on the monitor to make the user feel as if he were actually cycling, and a trainer character is further displayed to give suitable advices concerning the exercising state based on the detection results of a pedal rotation sensor and a heartbeat sensor (see Japanese Unexamined Patent Publications Nos. 7-250919, 11-137719 and 2000-5339).

A certain degree of improvement to prevent boredom resulting from the monotonousness of the conventional exercise by displaying the characters and the background image on the monitor can be recognized. However, only by enabling the user to see the background image which varies according to the exercise, the user will have more concern in the exercise to some extent, but it is hard to say that he comes to have an active will to exercise. Further, since the user receives suitable advices from the trainer character, a feeling of doing a passive exercise from start to finish cannot be denied.

SUMMARY OF THE INVENTION

In view of the above problems residing in the prior art, an object of the present invention is to provide exercise assisting method and apparatus which enable a user to finish an exercise menu in a more suitable condition while urging the user to have an active will to exercise.

An exercise assisting apparatus, as one of the forms according to the present invention, comprises: an exercise equipment having a movable portion for causing a user to exercise on a specified load condition, exercise detecting means for detecting a movement of the movable portion of the exercising equipment, pulse rate detecting means for detecting the pulse rate of the user, exercise monitoring means for monitoring an exercising state of the user in accordance with the detection results of the exercise detecting means and the pulse rate detecting means, a monitor provided on the exercising equipment for displaying a background image and a character corresponding to the user, image displaying means for causing the character to make a simulated motion related to the exercise within the background image on a screen of the monitor in accordance with the detection result of the exercise detecting means, game executing means for causing the character to make a specified motion belonging to the simulated exercise, and game evaluating means for giving a higher evaluation as the executed specified motion is made in a state closer to the one corresponding to a target pulse rate set beforehand.

With the above exercise assisting apparatus, if the user exercises using the movable portion of the exercising equipment, such a movement is detected by the exercise detecting means and the pulse rate of the user at that time is detected. The exercise monitoring means monitors the exercising state of the user in accordance with the detection results of the exercise detecting means and the pulse rate detecting means. For example, the exercise monitoring means calculates a consumed calorie, judges whether the user is exercising in a suitable, excessive or light load condition, and notifies the judgment result to the user if necessary. On the other hand, the character corresponding to the user is displayed together with the background image on the monitor screen, and the character is caused to make the simulated motion related to the exercise within the background image in accordance with the detection result of the exercise detecting means. At this time, the character on the monitor screen is caused to make the specified motion belonging to the simulated exercise by the game executing means. The game evaluating means gives a higher evaluation as the executed specified motion is made in a state closer to the one corresponding to a target pulse rate set beforehand. Thus, the user is led to such a psychological state or driven to have such a will as to aim to do a specified exercise at the target pulse rate set beforehand (preferably, aerobic exercise, etc.) in order to obtain a higher evaluation. Consequently, the exercise can be assisted while a preferable exercising state is maintained.

These and other objects, features and advantages of the present invention will become more apparent upon a reading of the following detailed description and accompanying drawings.

DETAILED DESCRIPTION OF THE PREFERRED EMBODIMENTS OF THE PRESENT INVENTION

Figure 1:
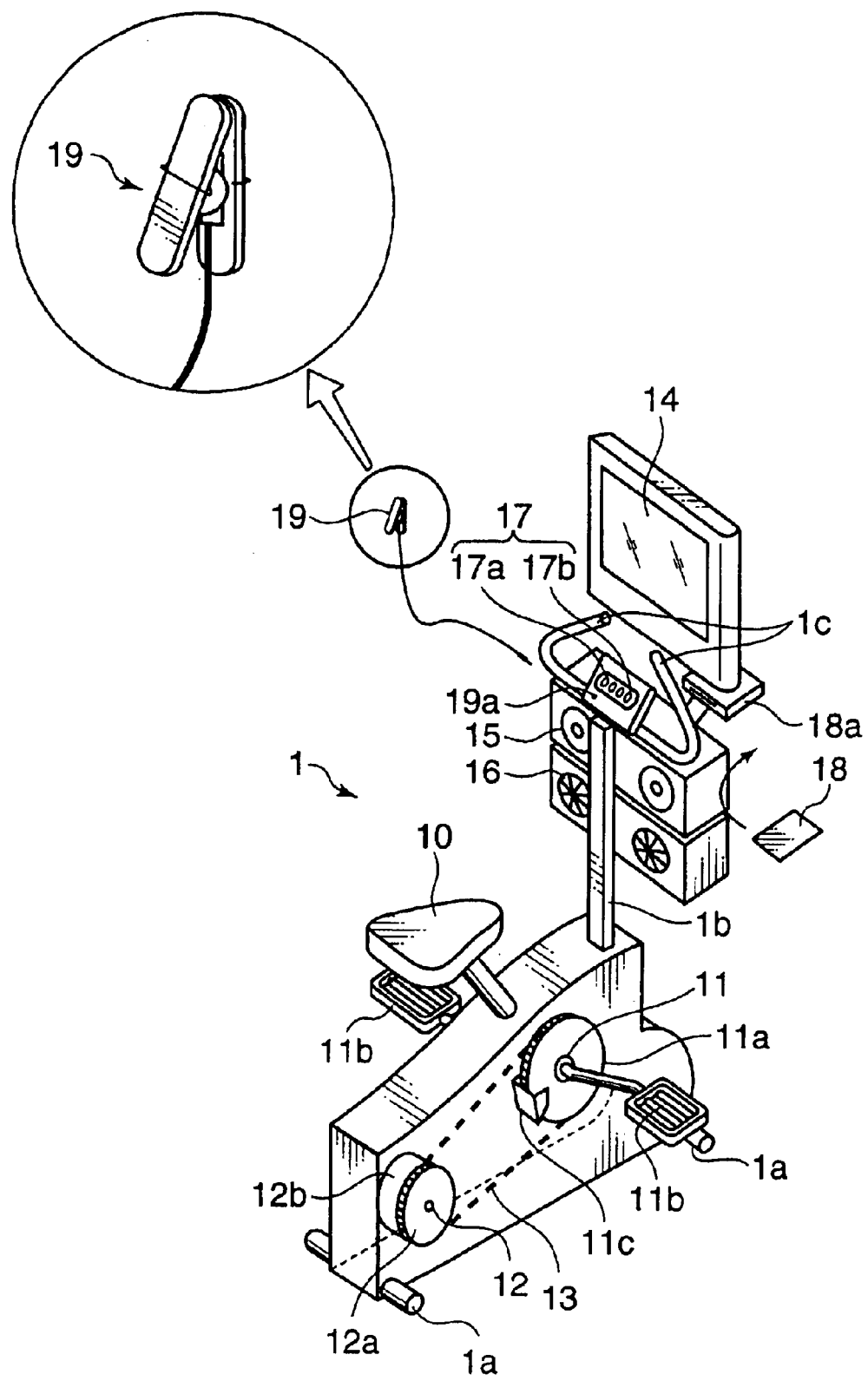
FIG. 1 is a perspective diagram showing a cycling machine as one example of an exercising equipment to which the invention is applied.

FIG. 1 is a perspective diagram showing a cycling machine as one example of an exercising equipment to which the invention is applied. The cycling machine is of the stationary type and simulates a bicycle excluding front and rear wheels. A saddle 10 is mounted atop a casing 1; leg portions 1a used to stabilize the position of the cycling machine are mounted at the front and rear bottom ends of the casing 1; and transversely horizontal rotary shafts 11, 12 are rotatably supported on the front and rear sides in the casing 1. Gears 11a, 12a are coupled to the rotary shafts 11, 12 so as to be rotatable together, and an endless chain 13 is mounted between the two gears 11a, 12a. A pair of pedals 11b are mounted at the opposite ends of the rotary shaft 11 so that the cycling machine can be pedaled by a user. This pedaling movement is transmitting from the rotary shaft 11 via the endless chain 13 to rotate the rear rotary shaft 12. In this embodiment, a rotation sensor 1c such as an encoder mounted to face the rotary shaft 11 with the gear 11a located therebetween is mounted on the front rotary shaft 11. The rotation sensor 11c includes, for example, a light emitter and a light detector opposed to each other with the gear 11a located therebetween, and generates a rotation pulse by outputting a pulse every time a tooth of the gear 11a passes, thereby substantially detecting the rotation of the pedals 11b. A mechanical switch may be adopted instead of a proximity sensor such as the rotation sensor including the light emitter and the light detector, or a rotary portion of the gear 11a other than the teeth may be detected.

An electromagnetic clutch 12b as a load condition changing member is mounted on the rear rotary shaft 12, so that an amount of load (braking amount) can be changed according to an adjustment of power supplied to the electromagnetic clutch 12b. Besides the electromagnetic clutch which varies the braking amount using an overcurrent, various other modes including, for example, one in which a mechanical braking member is used to vary the braking amount by an electric power or a hydraulic pressure may be adopted.

A support arm 1b stands at the front end of the casing 1; a monitor 14 is installed at a height position above the support arm 1b and substantially coinciding with the front side of the user's head sitting on the saddle 10; a loudspeaker 15 and a blowing fan 16 are so mounted below the monitor 14 as to face backward, and handles 1c are mounted on the support arm 1b. The loudspeaker 15 outputs specified messages and BGMs. The blowing fan 16 is so controlled as to rotate at a rotating speed corresponding to the detection result of the rotation sensor 11c, thereby making the user feel as if he were actually cycling outdoor.

An operation panel 17 is provided at the upper end of the support arm 1b and includes at least a pair of left and right buttons 17a, 17b. As described later, these buttons 17a, 17b are pressed by the user to change a moving direction on a monitor screen to left and right. The moving direction is changed by a specified angle every time the button 17a, 17b is pressed.

Further, a card reader 18a into which an individual card 18 is detachably mountable and an insertion slot 19a into which the leading end of a lead wire of a pulse rate sensor 19 are provided at suitable positions near the monitor 14. The individual card 18 is a magnetic card, an IC card or the like in which an individual information, an exercise history information and the like are renewably stored as described later. Although not shown, the card reader 18a enables reading and writing of information in and from the inserted individual card 18. The pulse rate sensor 19 detects the pulse rate of the user, and has a clip portion for clipping, for example, an earlobe as enlargedly shown. This sensor 19 optically detects a change in a blood flowing amount while clipping the earlobe, i.e. based on the level change of an amount of transmitted light.

A control unit 2 (see FIG. 2) formed by a microcomputer for receiving detection signals from the respective parts and outputting control signals to the respective parts is provided at a suitable position of the cycling machine. It should be noted that the control unit 2 may be separately provided without being attached to the respective exercising equipments.

Figure 2:
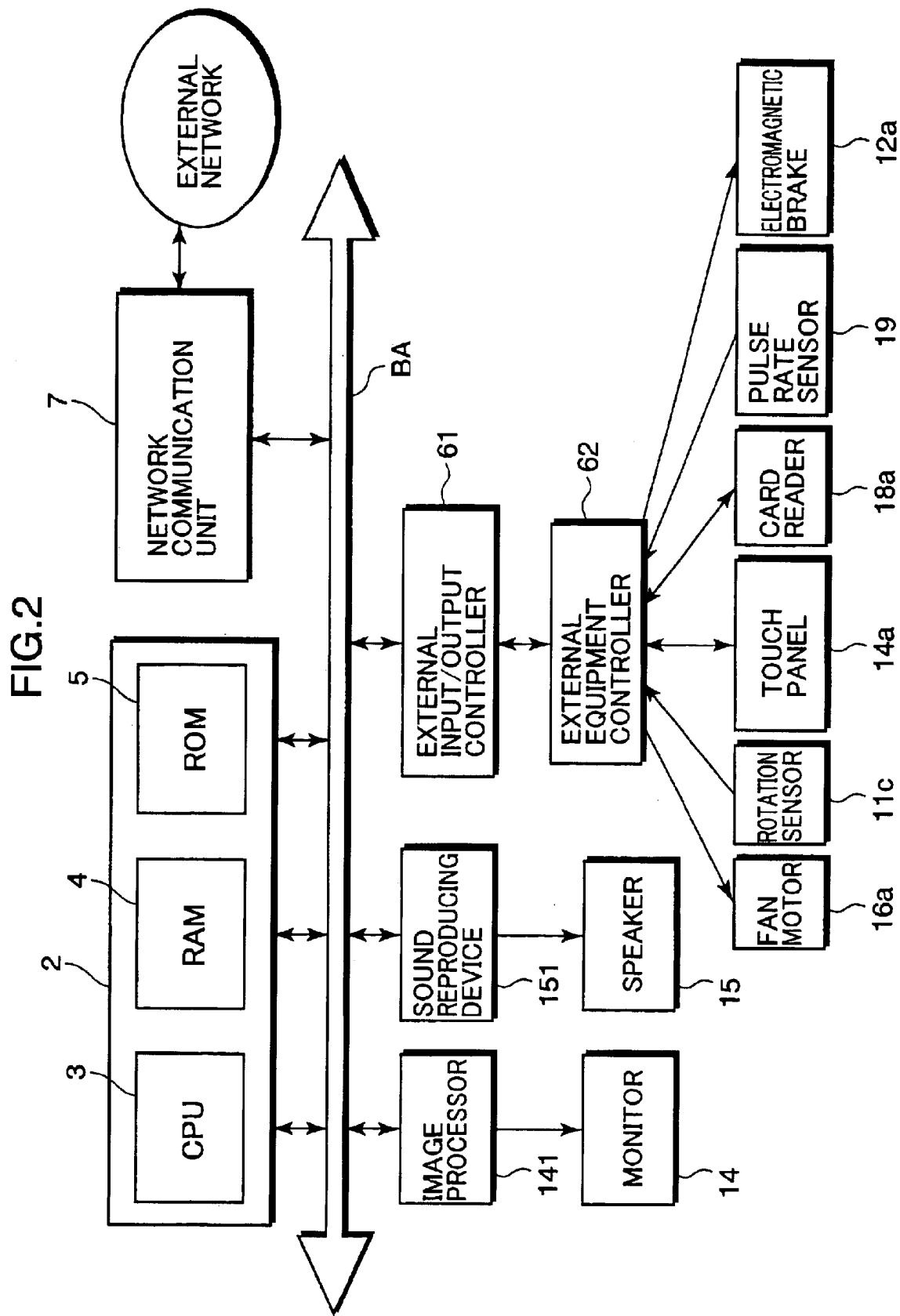
FIG. 2 is a hardware construction diagram showing one embodiment of an exercise assisting apparatus according to the invention.

FIG. 2 is a hardware construction diagram showing one embodiment of an exercise assisting apparatus according to the present invention. The control unit 2 controls the overall operation of this exercise assisting apparatus, and is provided with an information processing unit (CPU) 3, a RAM 4 for temporarily saving an information being processed, and a ROM 5 in which pieces of specified image information, various data used for the exercise assistance, a control program for the exercise assistance, and a game program to be described later are stored in advance. Out of what is stored in the ROM 5, at least the control program, the game program and the like that are influenced by a change of the exercise content or an assisting method may be stored in a detachably mountable external storage medium. A bus BA is a data transmission path.

An external input/output controller 61 converts the detection signals into digital signals to be processed between the control unit 2 and actuators (a fan motor 16a of the blowing fan 16, the card reader (reader/writer) 18a (writing) for the card 18) and detectors (the rotation sensor 11a, a touch panel 14a, the card reader (reader/writer) 18a (reading) for the card 18, the pulse rate sensor 19 and the electromagnetic clutch 12b) and outputs a command information by converting it into a control signal for the actuator. The controller 61 performs such signal processing and input/output processing, for example, in a time-sharing manner. An external equipment controller 62 outputs the control signals to the respective actuators and inputs the detection signals from the respective detectors during the respective time-sharing periods.

An image processor 141 displays a specified image on the monitor 14 in accordance with an image display command from the control unit 2 and includes a video RAM and the like. A sound reproducing device 151 outputs a specified message, a BGM or the like to the loudspeaker 15 in accordance with a command from the control unit 2.

A touch panel 14a is a rectangular thin layer element and is formed, for example, by covering pressure sensitive members made of a linear transparent material arrayed at specified intervals in vertical and horizontal directions by a transparent cover. The touch panel 14a is adhered to a tube surface of the monitor 14. The touch panel 14a having a known construction can be adopted. For example, a touch panel produced by printing long pressure-sensitive conductive inks, e.g. made of a thermoplastic resin in which conductive particles and nonconductive particles are diffused and mixed at corresponding positions of facing surfaces of two flexible film bases and then adhering these two film bases together may be used. Further, lead wires are connected with the respective pressure-sensitive conductive inks while being insulation-coated and drawn out of the films, wherein a specified voltage is applied to the lead wires of the one film base, and a circuit for detecting the voltage is so connected with the lead wires as to recognize the respective lead wires. Fine unevenness (resulting from the presence of fine particles during printing) is formed on contact surfaces of the pressure-sensitive conductive inks of the two film bases adhered together, a voltage appearing on the other lead wire as a result of a change in the substantial contact area of the ink surface, i.e. a resistance change on the contact surface brought about by a pressure exerted on the film base surface by a finger (or pushing pen, etc.) can be detected in an analog manner. In this way, a pressed position can be detected. Which one of the buttons displayed on the screen of the monitor 14 to urge the player to select has been pressed can be discriminated based on the addresses of the buttons and the pressed position.

In this embodiment, pieces of information in the individual card 18 includes the weight, target calorie consumption, target period, calorie consumption result, dates and results of training for the past several times (training history), number of remaining prepaid trainings, athletic ability (past average load level of the electromagnetic brake 12a), game score in addition to fixed information such as individual code (ID code), date of birth and sex. The individual card 18 is also capable of collectively storing the same pieces of information as above for other kinds of exercising equipments (a) to (d) shown, for example, in FIG. 26 besides this cycling machine. These pieces of information are preferably organized according to the respective machines or as a total information (e.g. game score, etc.) of all the machines if necessary.

Various messages including a trainer character 105, role-playing character 102 and a cycling machine character 103 simulating the user and the cycling machine respectively, background images, and images of result reporting screen are stored in the ROM 5 such that they can be superimposed. The trainer character 105, the role-playing character 102, the cycling machine character 103, and the background images are each formed by a specified number of polygons so as to be imaged in a three-dimensional manner. In accordance with an imaging command from the CPU 3, the image processor 141 mainly performs the calculation of a viewpoint position (in this embodiment, changes in the height and the direction of the camera as described later), the calculation in a three-dimensional (3D) space for the viewpoint, the calculation to convert a position in the 3D space to a position in a simulated 3D space, the calculation of a light source, writing of an image data to be formed in the video RAM based on the above calculation results, e.g., writing (adhering) of a texture data in an area of the video RAM designated by the polygon.

Here, a relationship between the operation of the CPU 3 and that of the image processor 14 is described. In accordance with the operating system stored in the ROM 5 which is built in or detachably mounted from outside, the CPU 3 reads the images, the sounds, the control program and the game program from the ROM 5. Part or all of the read image, sound and control program are saved in the RAM 4. Thereafter, the CPU 3 proceeds the processing in accordance with the control program and data (image data including polygons and textures of objects to be displayed and other character images, sound data) saved in the RAM 4, the detection signals from the detectors, and the contents of instructions given through the operation of the user. Specifically, the CPU 3 suitably generates commands as tasks to form images and output sounds in accordance with the detection signals and the contents of instruction from the user. The image processor 141 performs the calculation of the viewpoint, the calculation of the positions of the characters in the 3D space (of course, the same applies to a two-dimensional space) in relation to the viewpoint, the calculation of the light source, the generation of the sound data, and processing in accordance with the above command. Subsequently, the CPU 3 writes the image data of the image to be formed in the video RAM in accordance with the above calculation results. The image data written in the video RAM is fed to the monitor 14 (after being fed to the D/A converter via the interface and converted into an analog video signal), and is displayed as an image on the tube surface of the monitor 14. On the other hand, the sound data outputted from the sound reproducing device 151 is outputted as sounds from the loudspeaker 15 (via an amplifier after being fed to the D/A converter via the interface and converted into an analog video signal).

Imaging commands include those used to generate 3D images using polygons and those used to generate usual 2D images. Here, polygons are polygonal 2D virtual figures: triangular or rectangular in this embodiment. The image command used to generate a 3D image using the polygons includes a polygon vertex address data, a texture address data representing the saved positions of the texture data to be adhered to the polygons, a color palette address data representing the saved positions of the color palette data indicating the colors of the texture data, and a luminance data representing the luminance of the textures, these data being read from the ROM 5. One object is formed by a multitude of polygons. The CPU 3 saves the coordinate data of the respective polygons in the 3D space in the RAM 4. In the case that the character or the background image is moved, i.e. the viewpoint is changed, on the screen of the monitor 14, the following processing is performed. Specifically, the CPU 3 successively calculates 3D coordinate data of the respective polygons after movement and rotation based on the 3D coordinate data of the vertices of the respective polygons temporarily saved in the RAM 4 and movement amount data and rotation amount data of the respective polygons. Among the thus calculated 3D coordinate data of the respective polygons, coordinate data in horizontal and vertical directions are fed to the image processor 141 as the address data in a display area of the RAM 4, i.e. as the polygon vertex address data. The image processor 141 writes the texture data represented by the texture address data allotted in advance in the triangular or rectangular display area represented by three or four polygon vertex address data. In this way, an object (character, etc.) on which the texture data are adhered to a multitude of polygons is displayed on the display surface of the monitor 14.

Among various data stored in the ROM 5, those that can be stored in a detachably mountable storage medium may be made readable, for example, by a hard disk drive, an optical disk drive, a flexible disk drive, a silicone disk drive, a cassette medium reader or like drive. In such a case, the storage medium 5 is, for example, a hard disk drive, an optical disk drive, a flexible disk drive, a CD, a DVD, a semiconductor memory or the like.

A network communication unit 7 is adapted to renewably save various pieces of information renewed in the individual card 18 upon the completion of the training in an unillustrated administration server via an external network (Internet, etc.). If the training history and the like of the users can be collectively administrated, a list of the users having highly accomplished their targets or a list of the users having high game scores to be described later can be displayed in ranking on a monitor installed in a gym or fitness studio for the information purpose, whereby the users are more urged to train. Further, if an address information of the administration server is notified to the users (members), the members can individually confirm their own training histories and the like via their own communication instruments.

Figure 3:
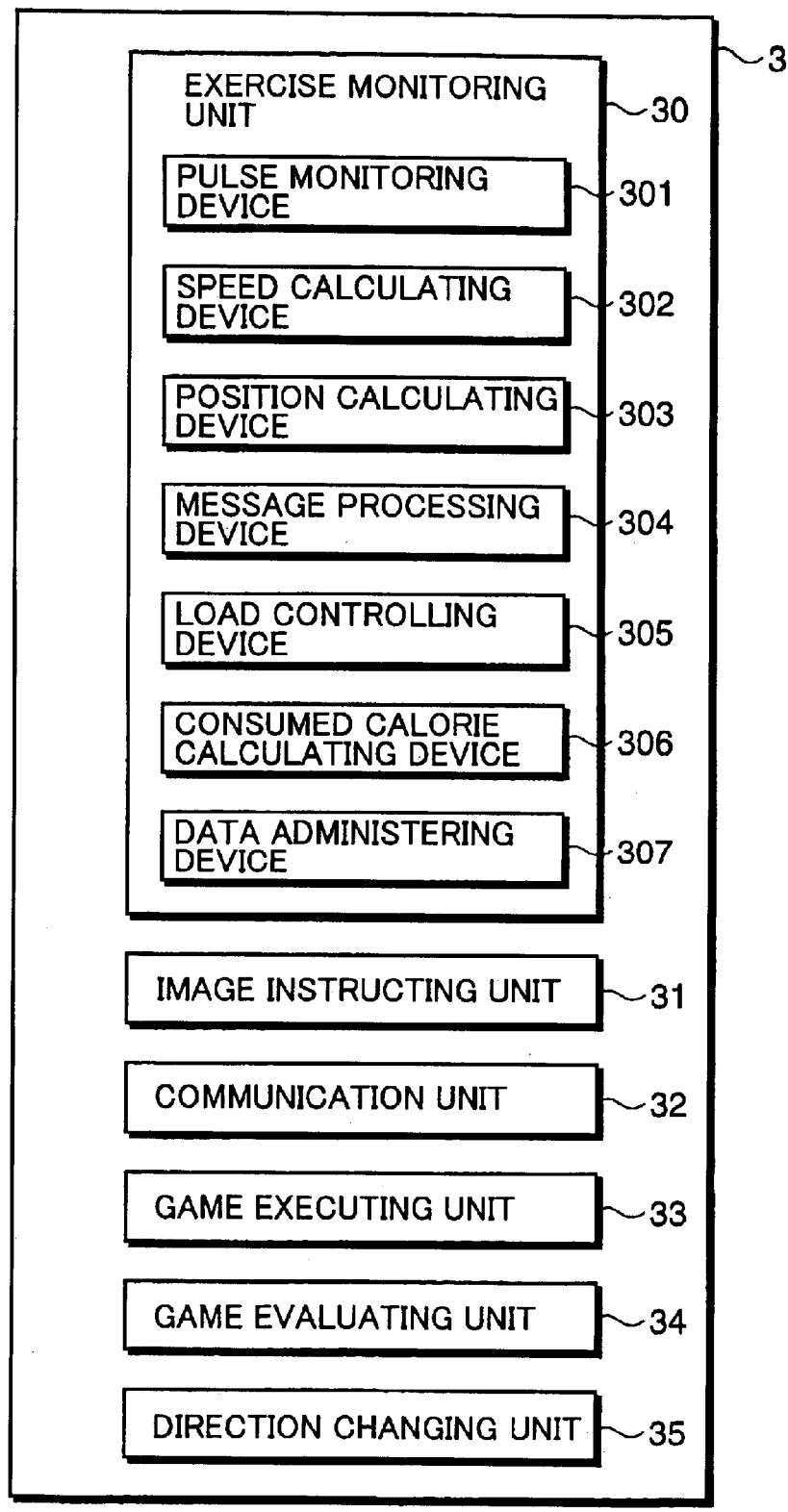
FIG. 3 is a software construction diagram of a CPU.

FIG. 3 is a software construction diagram of the CPU 3. The CPU 3 includes an exercise monitoring unit 30, an image instructing unit 31, a communication unit 32 for controlling the reading and writing of the data in and from the individual card 18, a game executing unit 33 for the game processing, a game evaluating unit 34, and a direction changing unit 35. The CPU 3 also includes a training timer for monitoring a training time, a pulse sensor timer for counting a time during which the pulse sensor 19 is off the earlobe, and a rotation sensor timer for counting a time during which the detection signal from the rotation sensor 11c is not inputted because the cycling machine is not pedaled.

The exercise monitoring unit 30 is provided with a pulse monitoring device 301, a speed calculating device 302, a position calculating device 303, a message processing device 304, a load controlling device 305, a consumed calorie calculating device 306, and a data administering device 307. The pulse monitoring device 301 calculates the pulse rate per minute based on the detection signal from the pulse sensor 19 and monitors a difference between the calculated pulse rate and a set target value. The speed calculating device 302 calculates the turning speed of the pedals 11b (virtually running speed of the simulated cycling machine) based on the cycle of the rotation signal from the rotation sensor 11c. The position calculating device 303 calculates a position from a starting point, i.e. a current position based on the calculated speed. The message processing device 304 displays advices (including warnings) suitably reflecting the difference between the pulse rate information monitored by the pulse monitoring device 301 and the target pulse rate and/or the information of at least one of the speed calculating device 302 and the position calculating device 303 on the monitor 14 in a superimposed manner. The load controlling device 305 varies a braking amount of the electromagnetic clutch 12b based on the information on the pulse rate monitored by the pulse monitoring device 301. The consumed calorie calculating device 306 calculates a consumed calorie per unit time based on the speed calculated by the speed calculating device 302, the pulse rate calculated by the pulse monitoring device 301, the age, weight and other parameters read from the individual card 18, and calculates the calorie consumed from the start of the exercise to the present by multiplying the calculated consumed calorie per unit time by the exercise time. The data administering device 307 administers various individual data including the training history. It should be noted that the consumed calorie calculating device 306 may obtain the consumed calorie per unit time by reading it from a table memory storing a table of consumed calories per unit time in relation to the above parameters beforehand.

The image instructing device 31 sends the imaging commands as described above to the image processor 141.

The game executing unit 33 executes a specified game during the exercise at random, regularly or in accordance with the user's instruction. In this embodiment, a game in which jumps are made on jumping platforms prepared on running roads in the background image for the cycle machine character 103 role-playing character 102) is adopted. The game evaluating unit 34 judges a landing position after a jump on a specified condition. Specifically, in this embodiment, the game evaluating unit 34 judges how close the landing position is to the one corresponding to a jumping distance when a jump is made at the running speed where the pulse rate is the target pulse rate. The closer the landing position, the higher score the game evaluating unit 34 gives.

The direction changing unit 35 changes the running direction of the cycling machine character 103 on the screen of the monitor 14 to left or right by a specified angle every time the button 17a, 17b is pressed.

Figure 4:
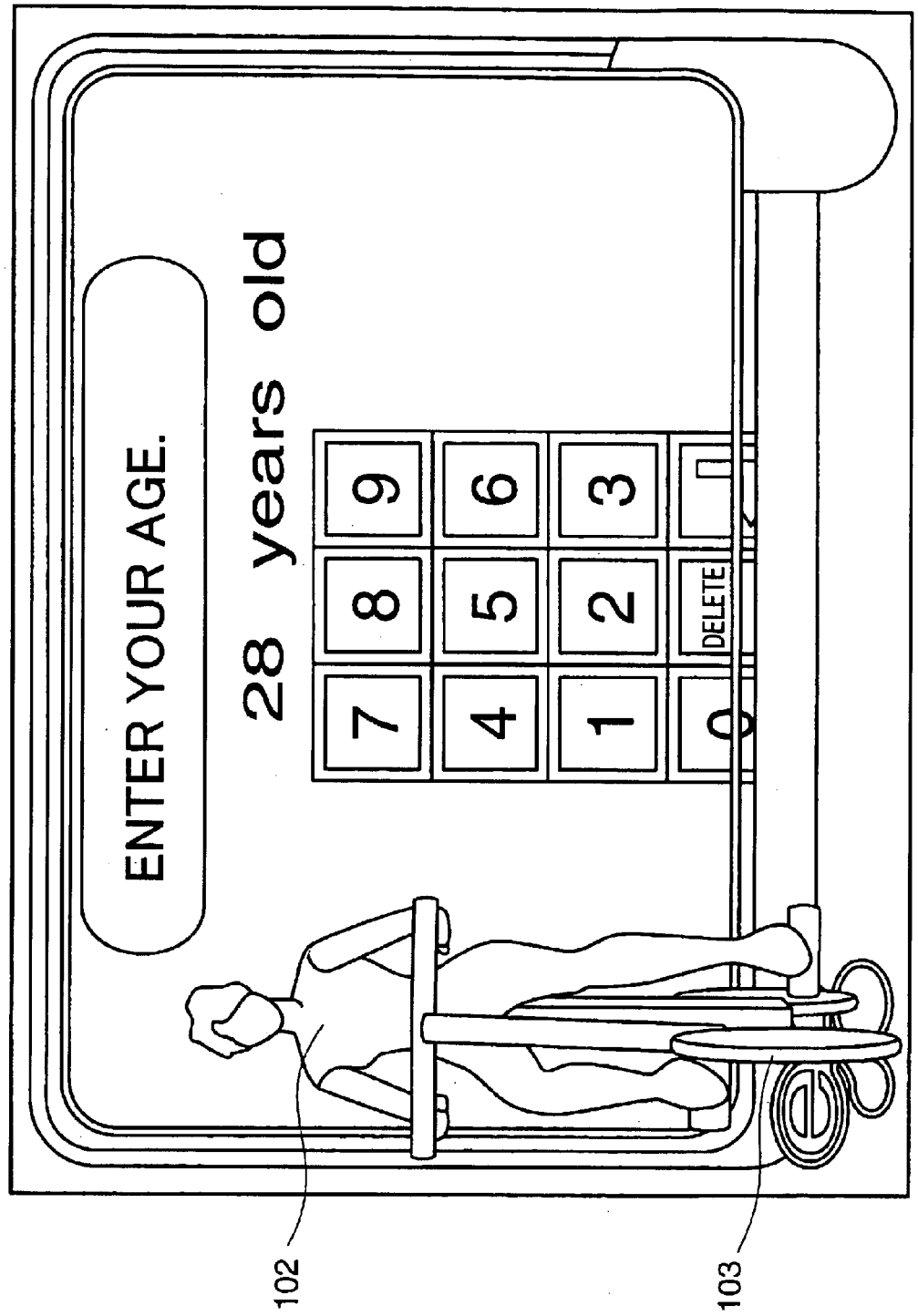
FIG. 4 is a diagram showing an initial screen switched from a standby screen when a specified position of a touch panel is pressed while the standby screen is displayed.

Subsequently, images to be displayed on the monitor screen are described with reference to FIGS. 4–20. FIG. 4 shows an initial screen switched from a standby screen when a specified position of the touch panel 14a is pressed, and a sentence guiding the entry of the age and a matrix of numbers "0" to "9" are displayed on this initial screen. The user's age is displayed for confirmation by pressing the corresponding numbers. For example, if "2", "8" are successively pressed, the age "28" is displayed for confirmation. Among squares, the one in the second column of the fourth row is used for cancellation (enabling reentry), and the one in the third column of the same row is used for confirmation. In FIGS. 4–7 images are displayed such that the role-playing character 102 and the cycling machine character 103 are at specified positions of the screen, in this embodiment on the right side, and the viewpoint of the camera is located in the middle.

Figure 5:
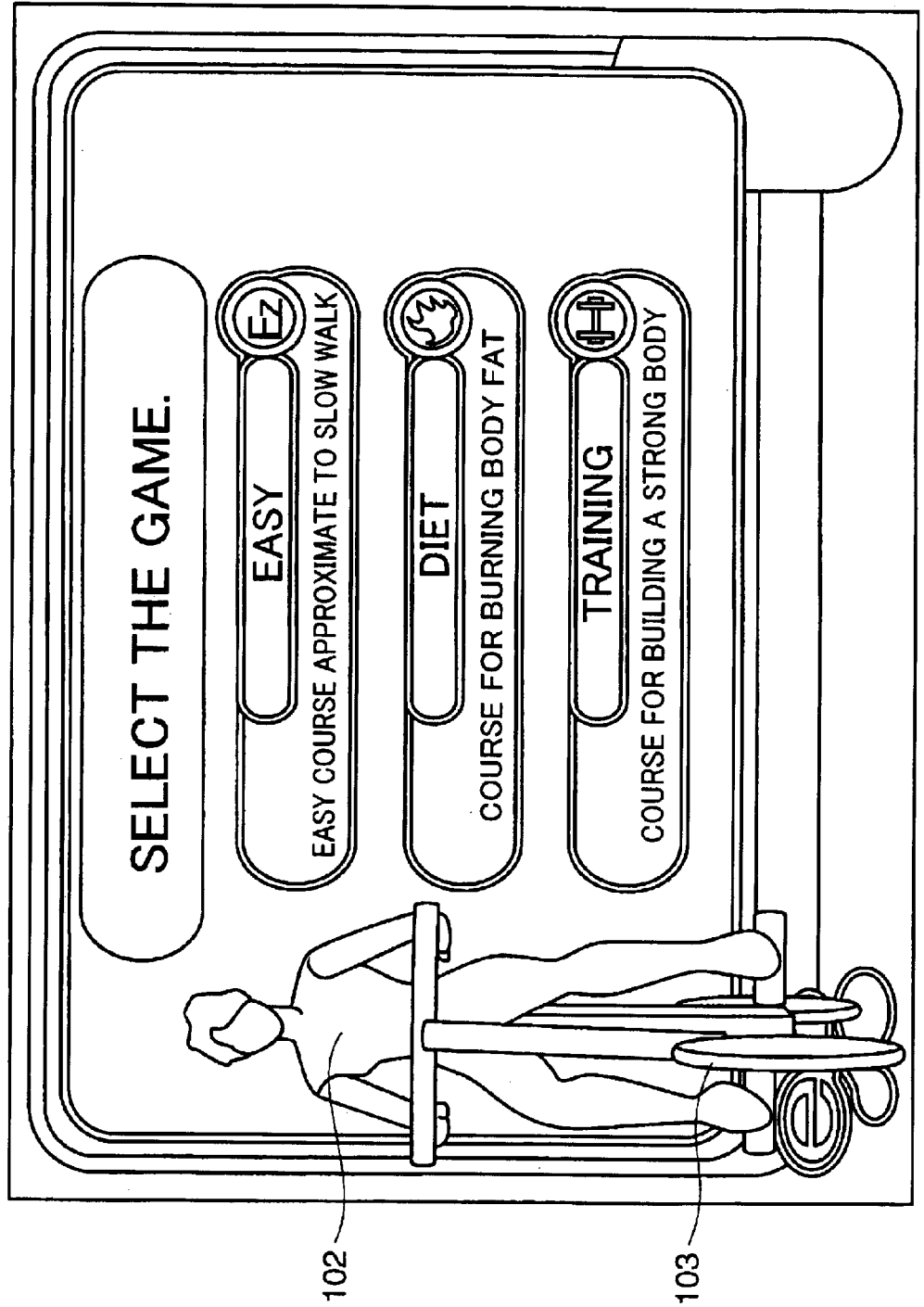
FIG. 5 is a diagram showing a guide screen used for the selection of an exercise course.

FIG. 5 shows a guide screen urging the user to select the exercise course following the entry of the age. An "Easy" course almost approximate to a walk, a "Diet" course for burning a body fat, and a "Training" course for a trained strong body are selectably displayed. The latter the course, the higher calorie consumption. In other words, the latter the course, at least one of the exercise time, the running distance and the load is set at a larger value to correspond to the respective courses.

Figure 6:
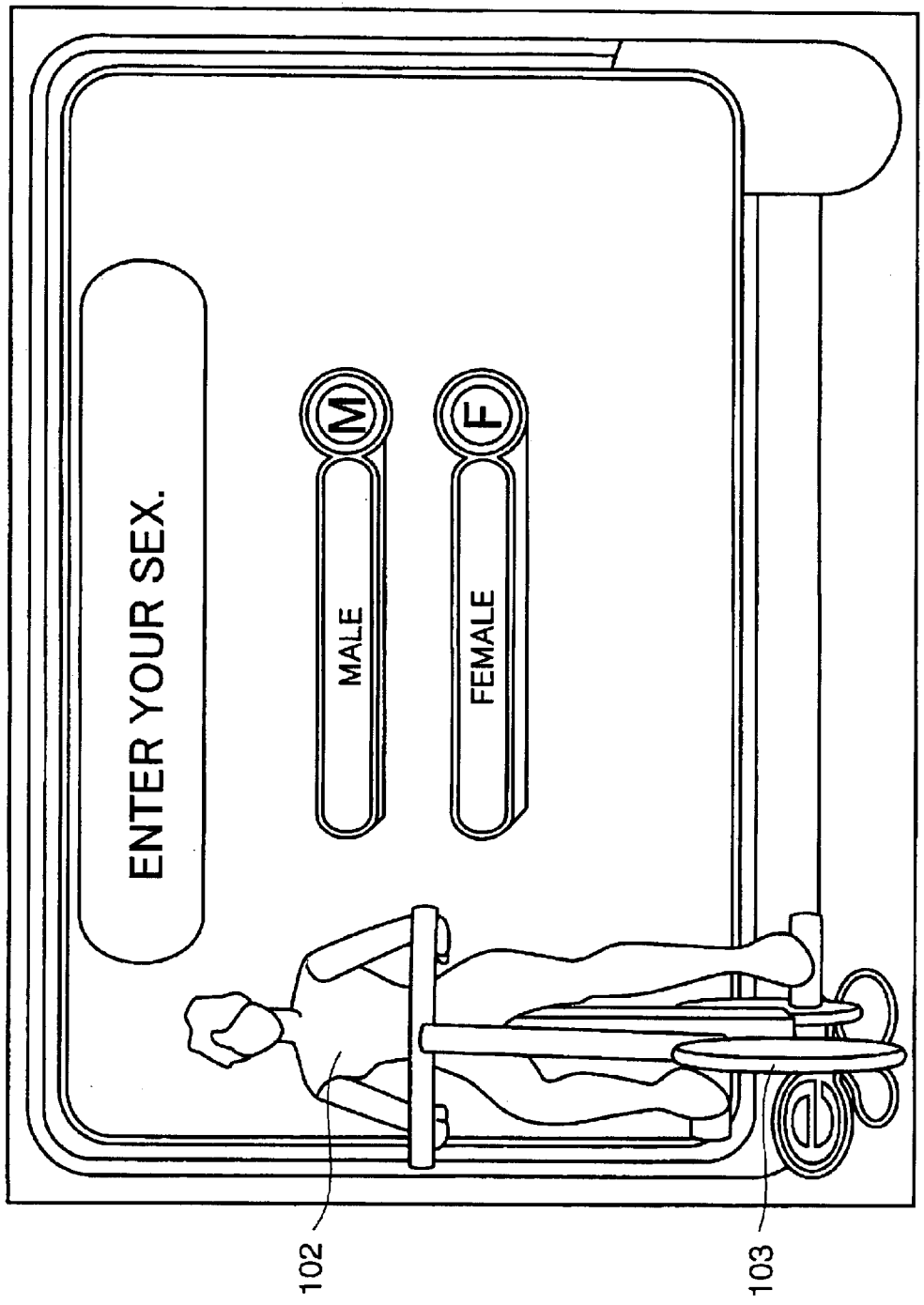
FIG. 6 is a diagram of a screen used to guide the input of sex.

FIG. 6 shows a screen guiding the entry of sex following the selection of the course, whereon buttons of "Man" and "Woman" are selectably displayed.

Figure 7:
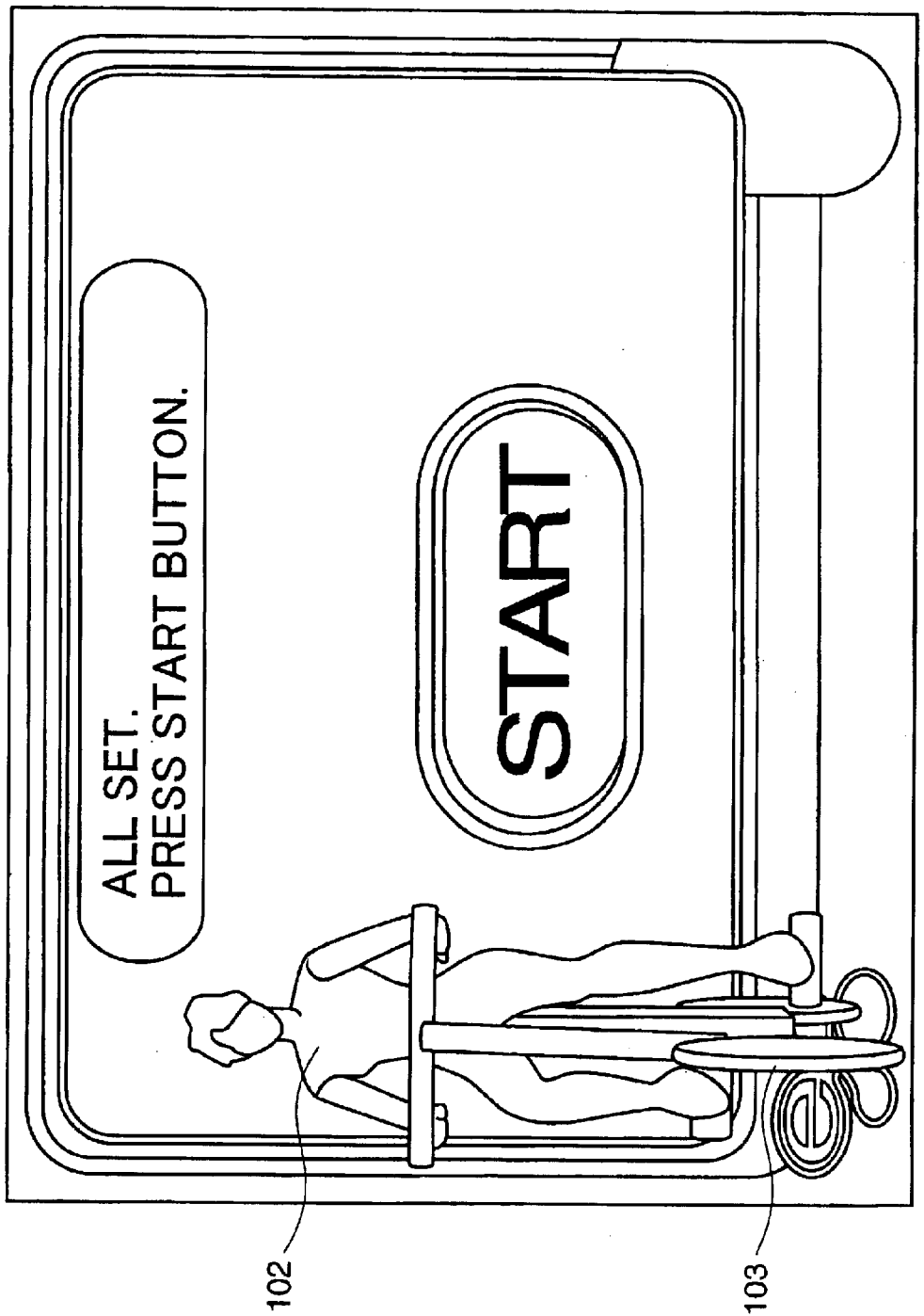
FIG. 7 is a diagram showing a screen waiting for the start.

FIG. 7 shows a screen waiting for the start upon the completion of the entry of the individual data, whereon a "START" button is pressably displayed in the middle.

Figure 8:
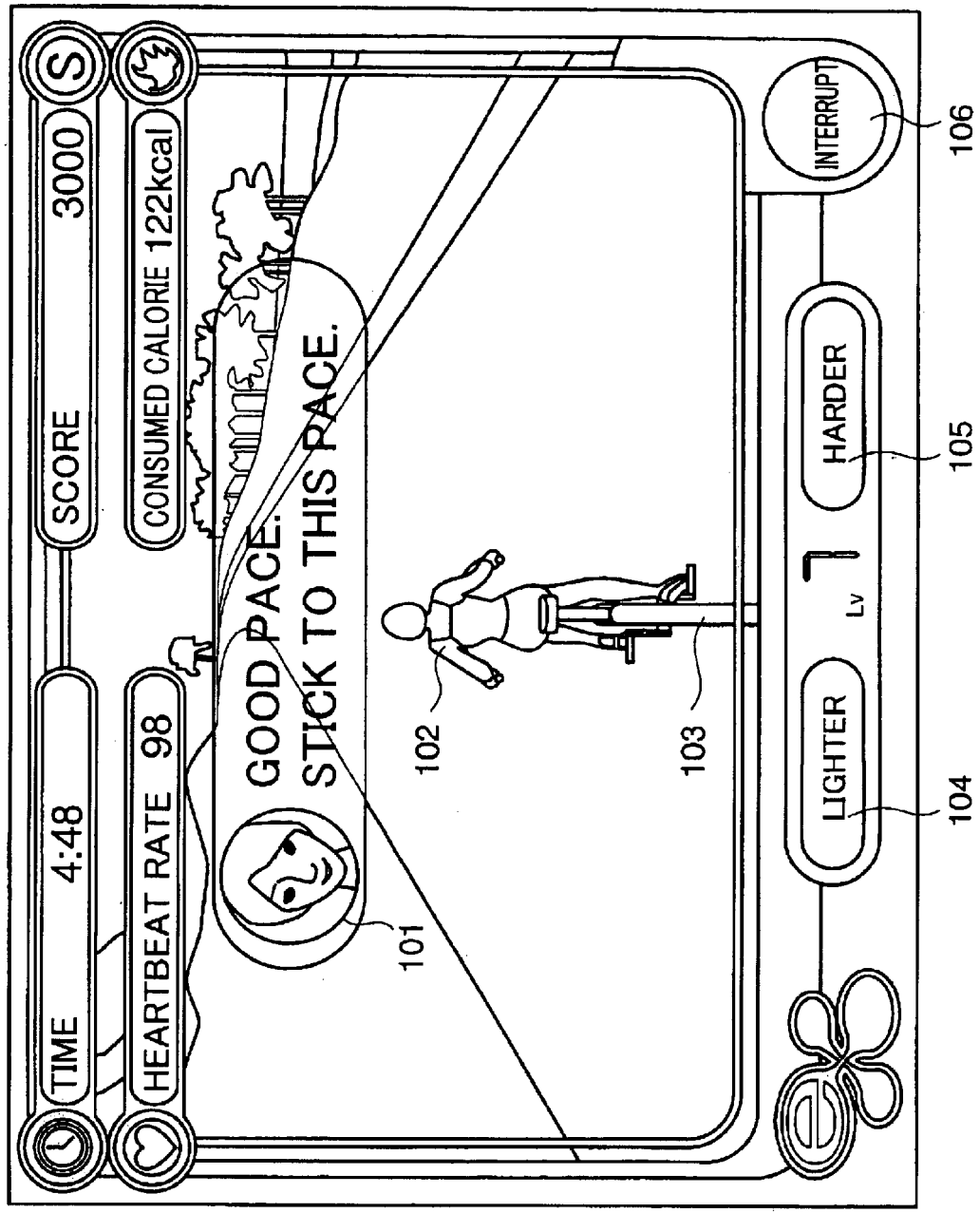
FIG. 8 is a diagram of a screen displayed upon the lapse of a specified period after the start.

FIG. 8 is a diagram showing a screen upon the lapse of some time e.g., 4 min. 48 sec. after the start. On the screen, a scenery image (background image) including a road as a running road as a background is displayed and the role-playing character 102 riding on the cycling machine character 103 on the road is displayed from the camera viewpoint located behind. The roll-playing role-playing character 102 corresponds to the user and is so displayed as to pedal the cycling machine character 103 at a speed corresponding to the speed information obtained by the speed calculating device 302 in accordance with the rotation signal from the rotation sensor 11c (to make a motion (simulated motion) related to the exercise performed by the user), and a running movement is presented by relatively moving the position of the cycling machine character 103 in accordance with the position information obtained by the position calculating device 303, in other words, relatively moving the scenery image in a direction opposite from the running direction.

Further, the lapse of time, the heartbeat rate (pulse rate) per min., the score as a result of the execution of the game, and the consumed calorie are constantly displayed on the screen. On this screen, the user's heartbeat rate is "98", and the user is exercising in a substantially suitable state assuming that the target heartbeat rate is set at "100". Accordingly, the head of the trainer character 101 and a message saying "Good pace. Stick to this pace." are displayed on the screen.

"Harder" button and "Lighter" button 104, 105 displayed at the left and right sides below the screen are used to give the user an opportunity to change the load condition. Further, an "Interrupt" button 106 at the right end below the screen is used to instruct the interruption of the exercise. In this embodiment, the exercise is ended if the interruption by the "Interrupt" button 106 lasts longer than a specified period.

Figure 9:
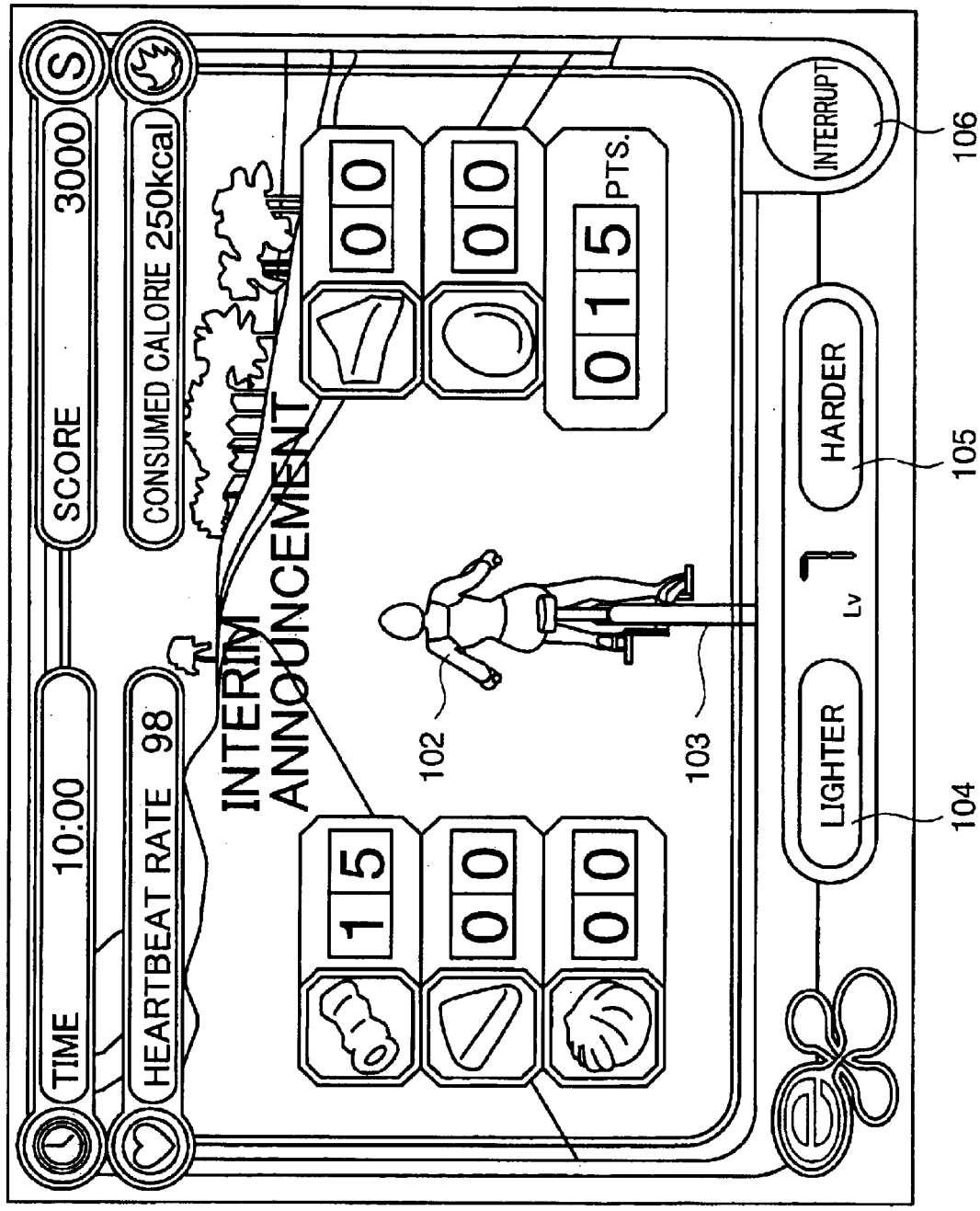
FIG. 9 is a diagram of a screen displayed, for example, at a midpoint of a period set in advance.

FIG. 9 shows a screen displayed at a preset midpoint in time, e.g. upon the lapse of 10 min. from the start. This screen is substantially the same as the screen of FIG. 8 except the content of the message and the scenery image. A term "Interim Announcement" is displayed as a message and the acquirement of various items and a total sum are displayed. The respective items are prepared at suitable positions on the road, and the acquirement of the item is judged by judging the passage of the position on the road, i.e. whether or not the coordinates of the item and the coordinates of the bottom of the tire of the cycling machine character 103 coincide with each other.

Figure 10:
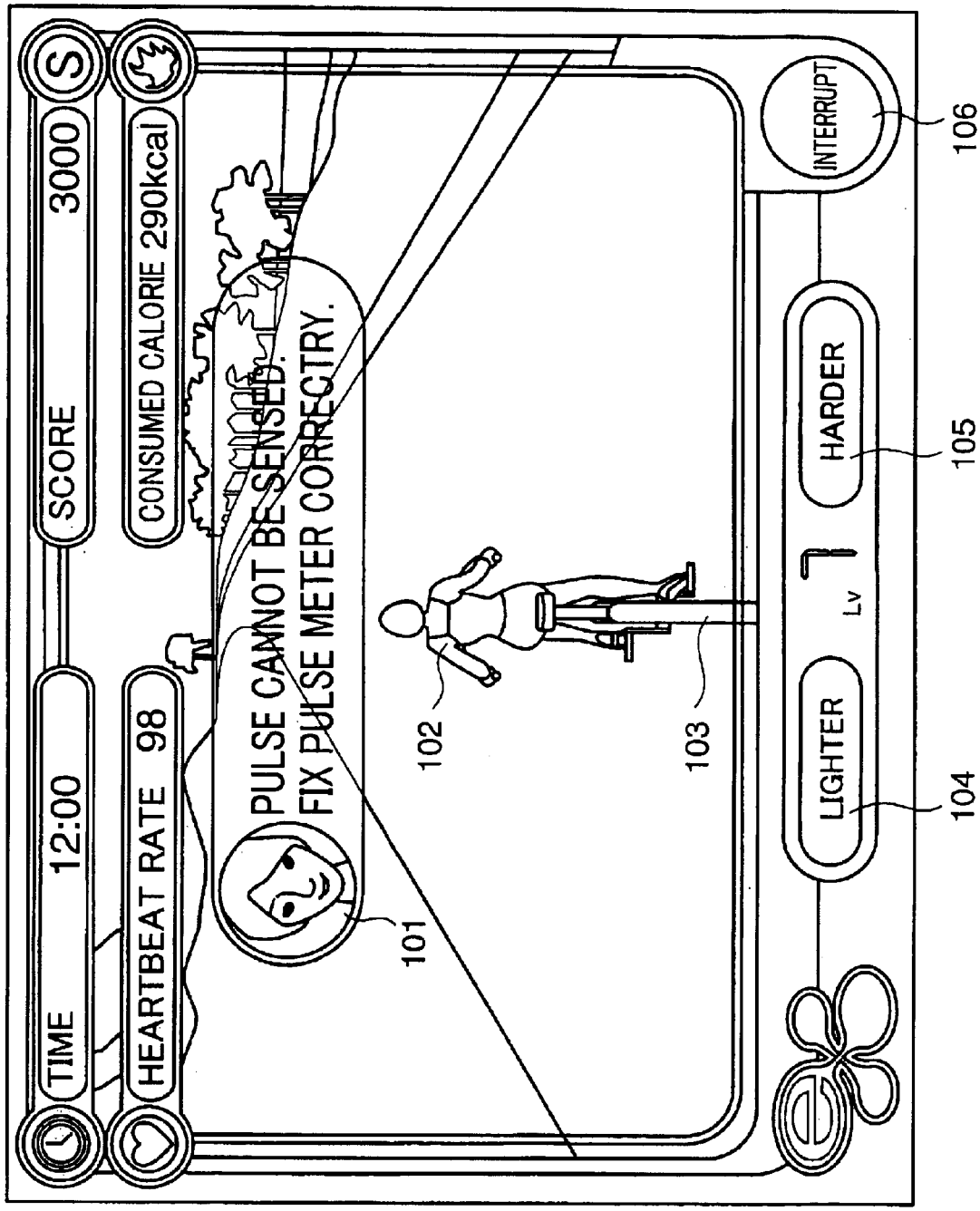
FIG. 10 is a diagram of a screen displaying a message, assuming that a pulse sensor is off an earlobe of a user doing an exercise.

FIG. 10 shows a screen to give a message assuming that the pulse sensor 19 is off the earlobe of the user doing the exercise. In the case that the detection signal from the pulse sensor 19 has not been inputted for a specified continuous period, the head of the trainer character 101 and a message "Pulse cannot be sensed. Please fix the pulse meter correctly." are displayed when the built-in pulse sensor timer measures this specified period. This makes the user notice that the pulse sensor is off his earlobe.

Figure 11:
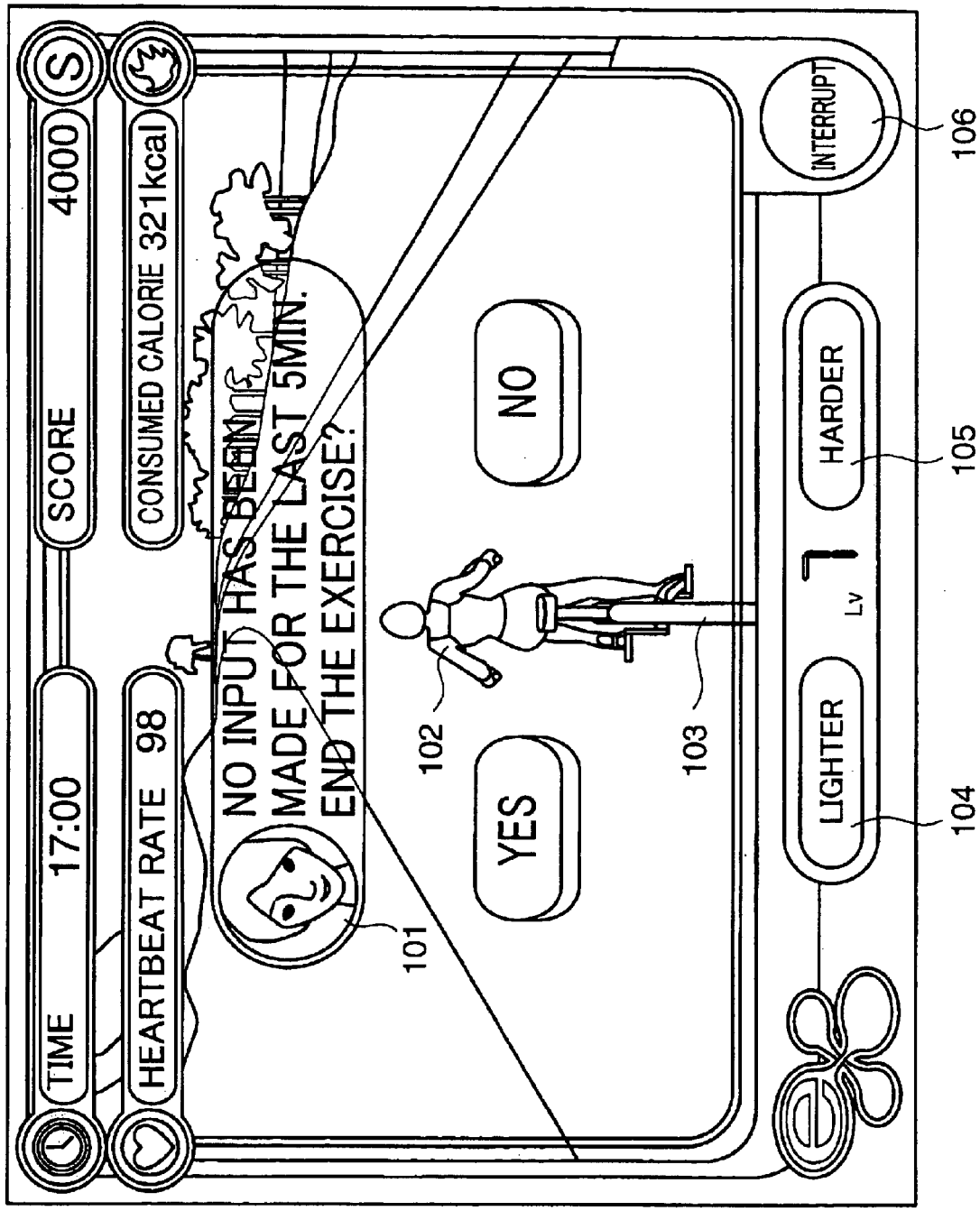
FIG. 11 is a diagram of a screen displaying a message, assuming that a cycling machine has not been pedaled during the exercise.

FIG. 11 shows a screen displayed to give a message assuming that the rotation of the pedals 11b has been stopped during the exercise (for example, because the user has temporarily left the cycling machine). In the case that the detection signal from the pulse sensor 19 has not been inputted for a specified continuous period, the head of the trainer character 101 and a message "No input has been made for the last 5 min. End the exercise?" are displayed when the built-in rotation sensor timer measures this specified period. In this way, the user's will to continue to exercise is confirmed.

Figure 12:
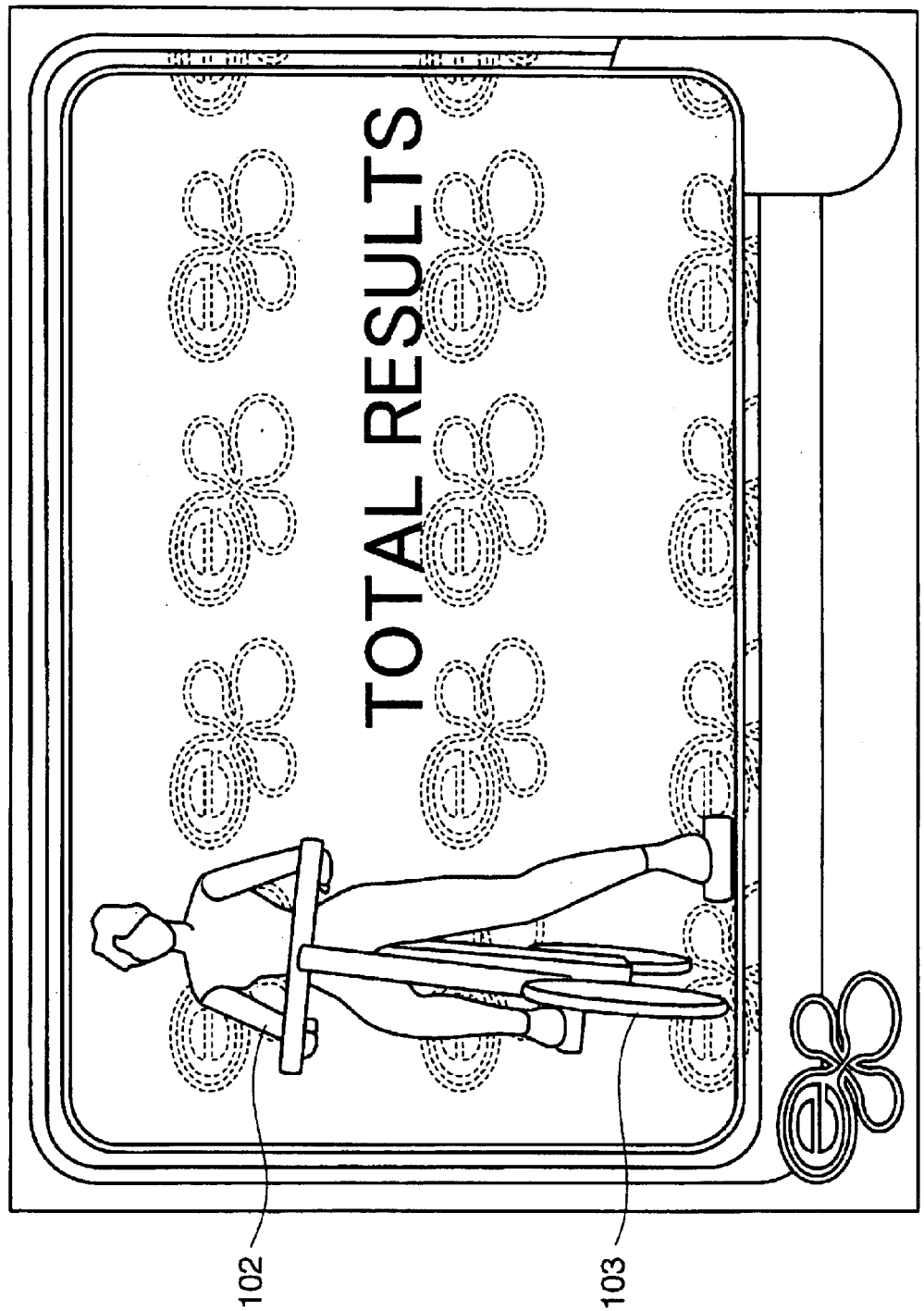
FIG. 12 is a diagram showing a screen displaying that total results are to come.
Figure 13:
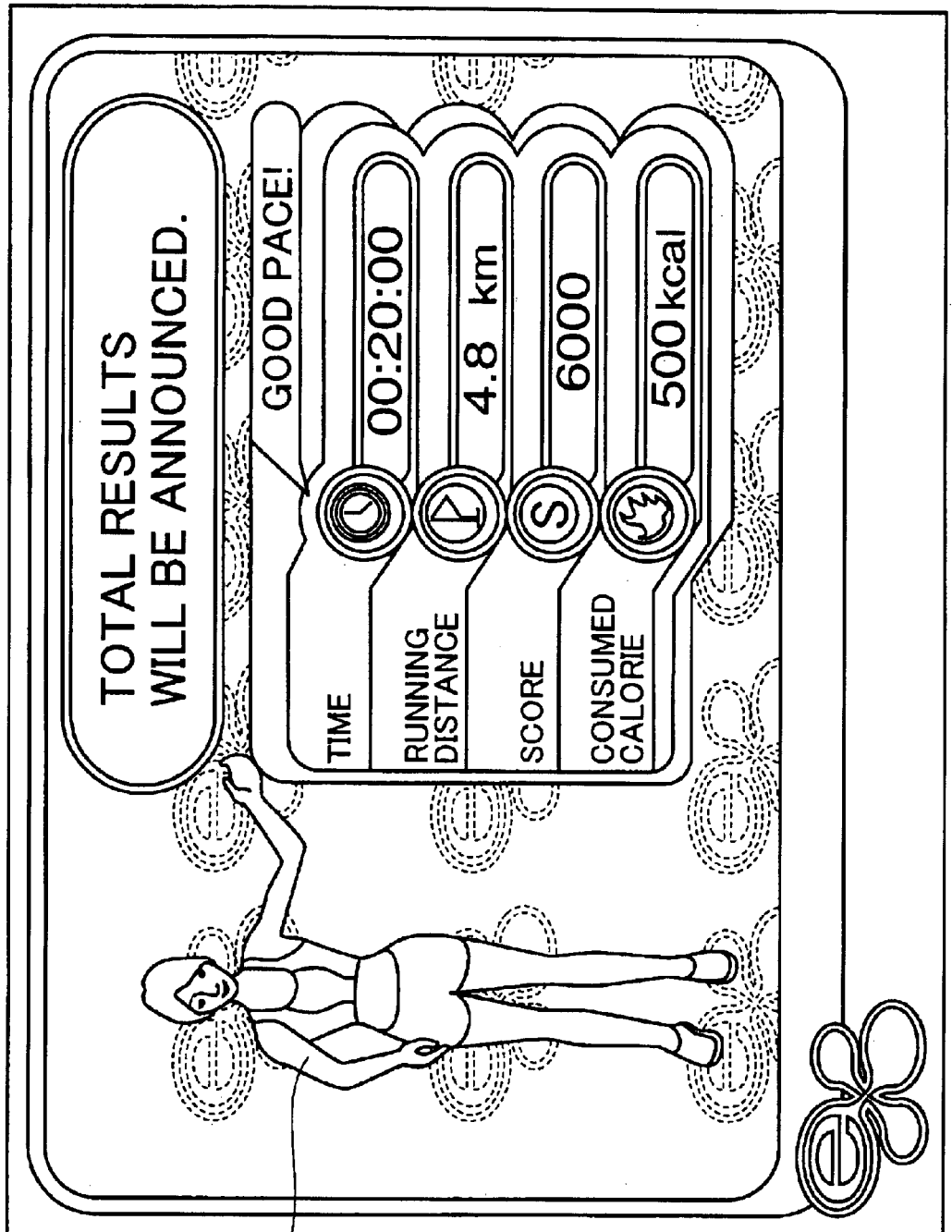
FIG. 13 is a diagram of a screen reporting the total results.
Figure 14:
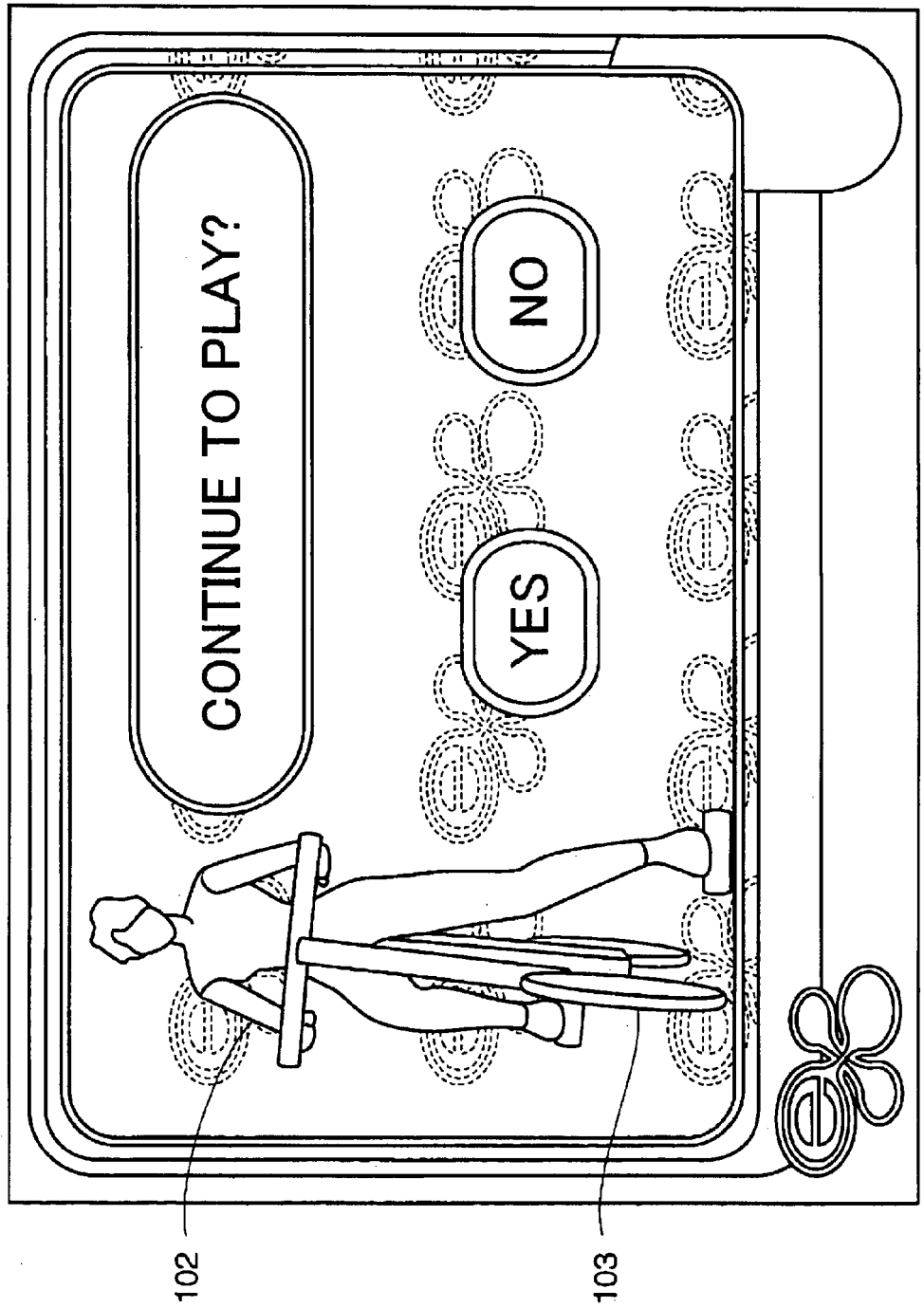
FIG. 14 is a diagram of a screen used to confirm whether or not the user continues to exercise.
Figure 15:
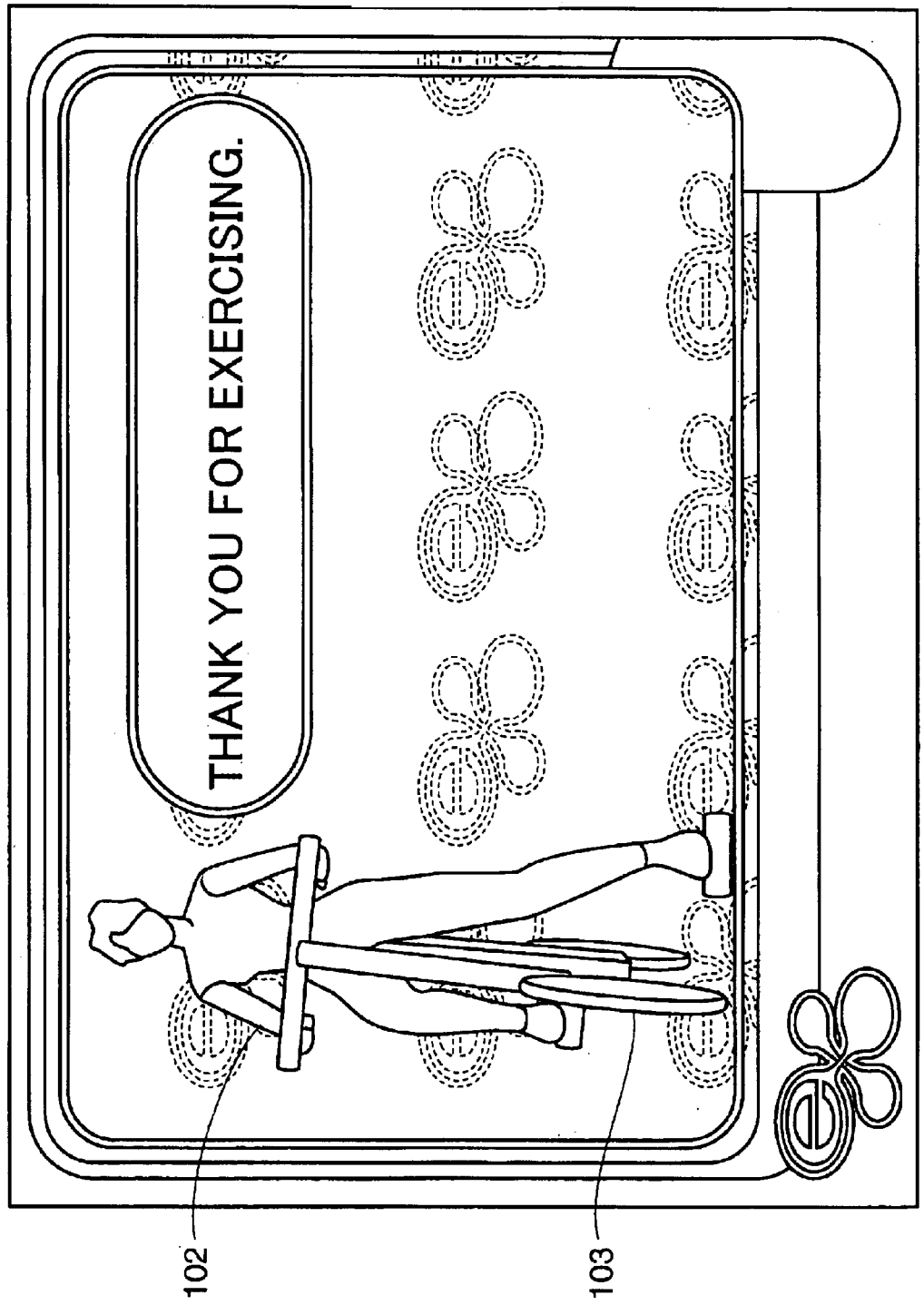
FIG. 15 is a diagram of a screen to be displayed when "NO" is selected in FIG. 14.
Figure 16:
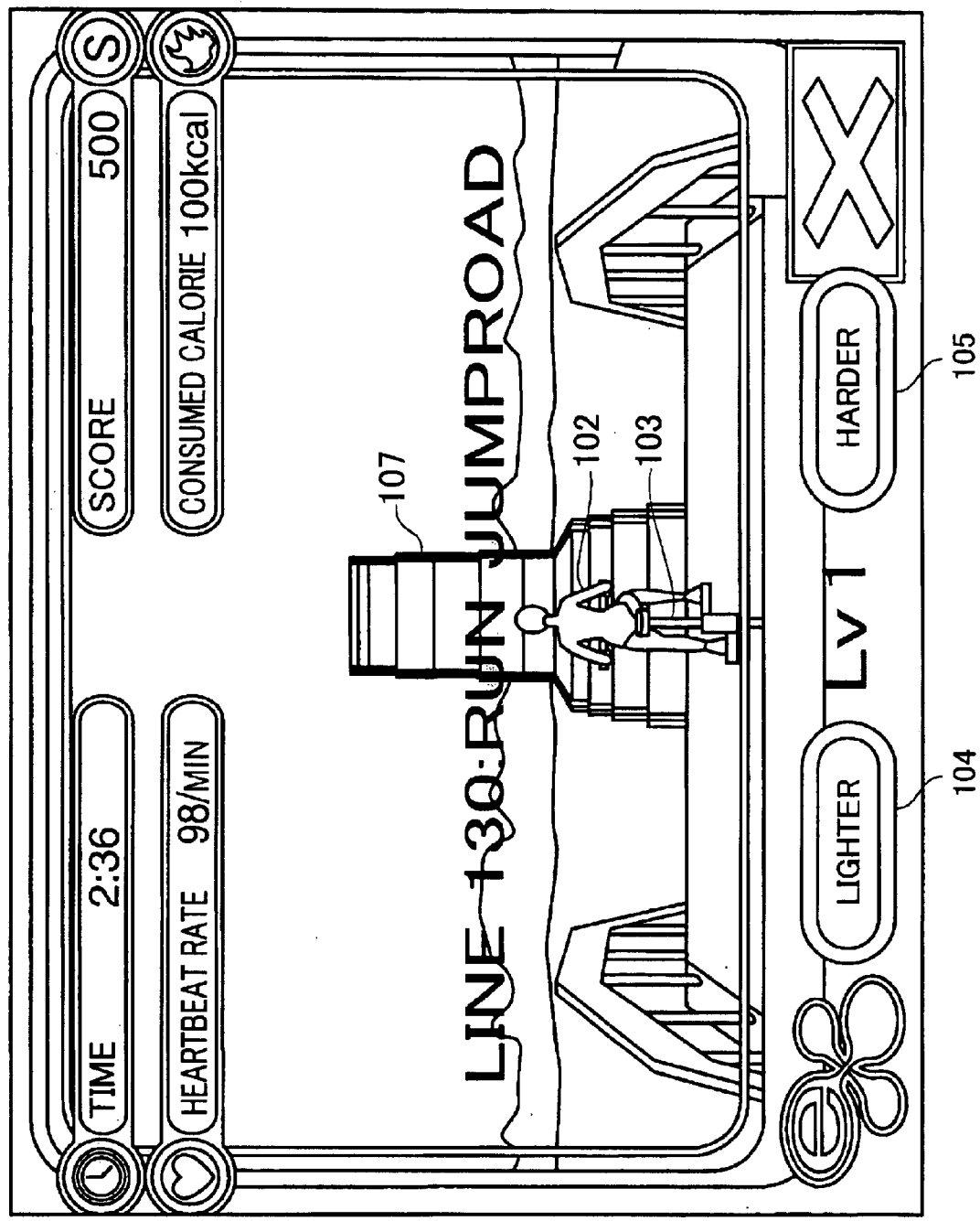
FIG. 16 is a diagram of a screen showing an exemplary game in which a jumping platform image appears.

FIG. 12 shows a screen switched upon the end of the exercise to give a message that "Total Results" are to be displayed. The role-playing character 102 and the cycling machine character 103 are at specified positions on the screen, in this embodiment on the right side, and the viewpoint of the camera is located in the middle. FIG. 13 shows a total-results reporting screen displaying the lapse of time from the start to the end, the running distance, the score and the consumed calories. The entire body of the trainer character 101 is displayed at a specified position on the screen, in this embodiment on the left side, and the viewpoint of the camera is located in the middle, whereby an atmosphere as if the results were actually announced is created. FIG. 14 shows a screen displayed to confirm whether or not the user continues to exercise, whereon "YES", "NO" buttons are selectably displayed. FIG. 15 shows a screen switched when "NO" is selected on the screen of FIG. 14, wherein a message "Thank you for exercising." is displayed.

Figure 17:
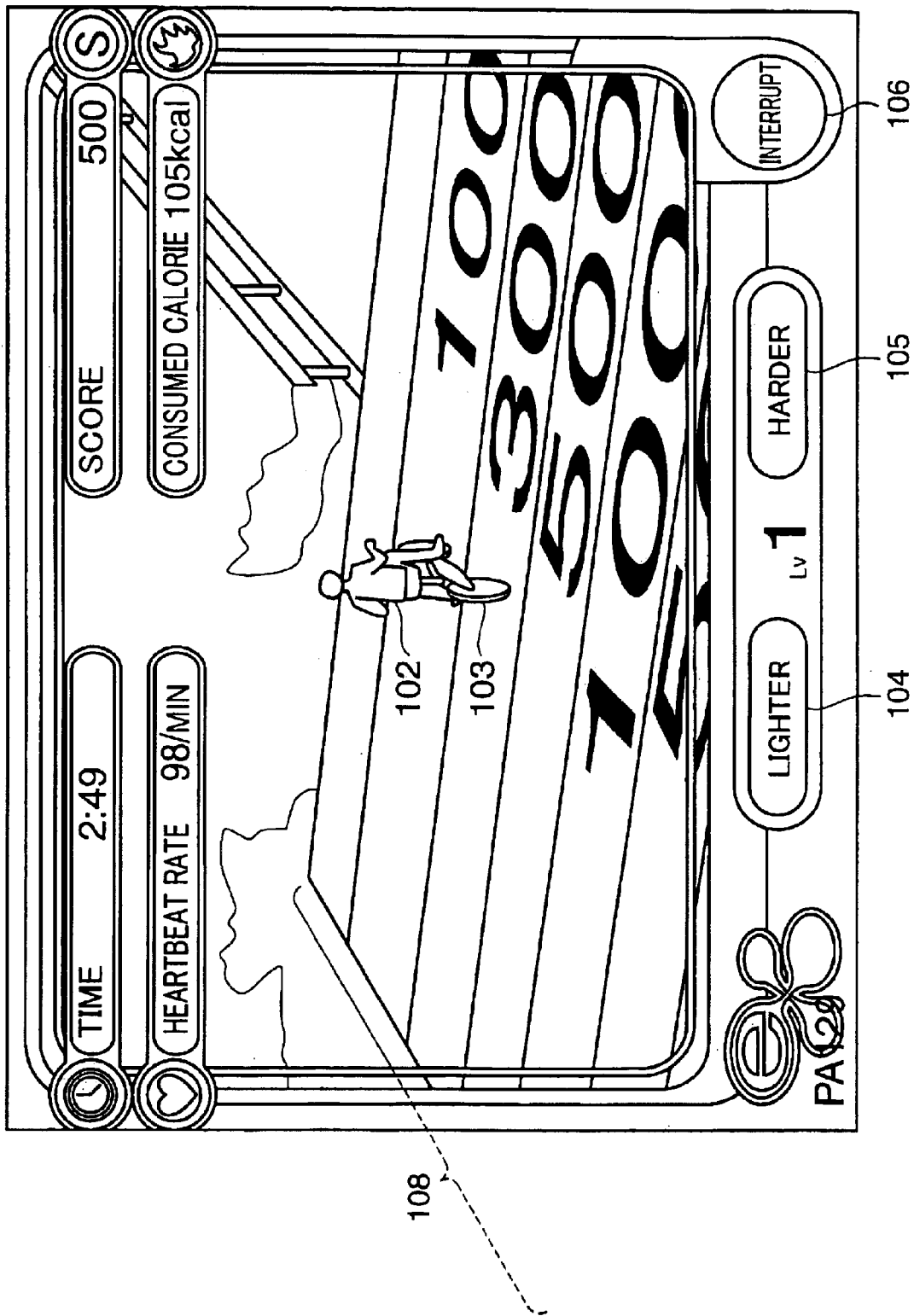
FIG. 17 is a diagram of a screen displayed during a jump.

FIGS. 16 to 19 show screens showing one exemplary game. The game executing unit 33 switches the screen to the one in which a jumping platform image 107 appears within the scenery image during the exercise (see FIG. 16). The user virtually moves onto the jumping platform image 107 by pedaling the cycling machine. FIG. 17 shows a screen displayed during the jump, whereon a landing area image 108 is divided into a plurality of zones along a jumping direction and numbers are displayed within the respective zones. These numbers represent scores. The scores successively decrease from 500 pts. to 300 pts. to 100 pts. in forward and backward directions from 1000 pts. in the middle.

Figure 18:
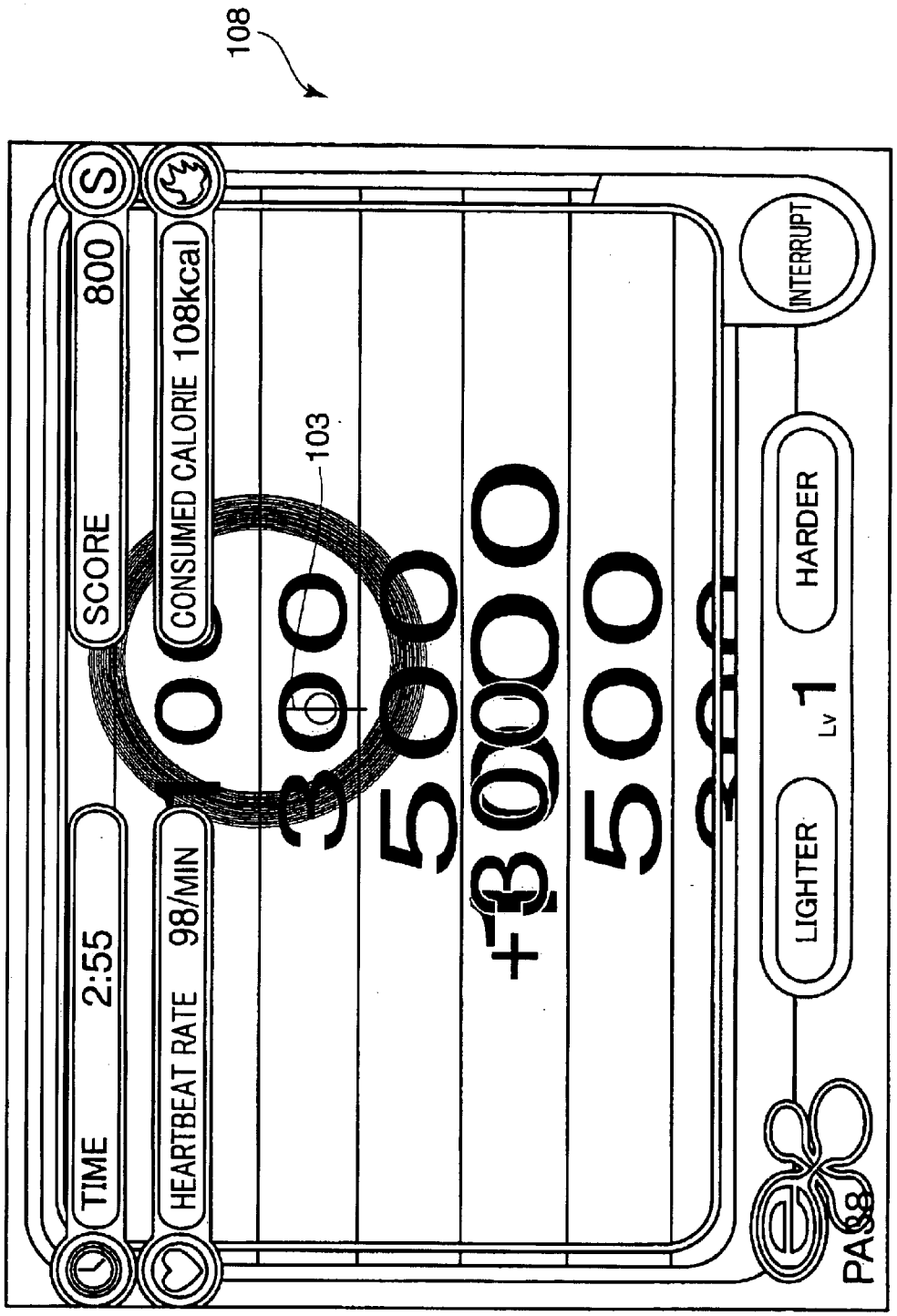
FIG. 18 is a diagram of a screen displayed when a position of landing is within a zone of 300 points.
Figure 19:
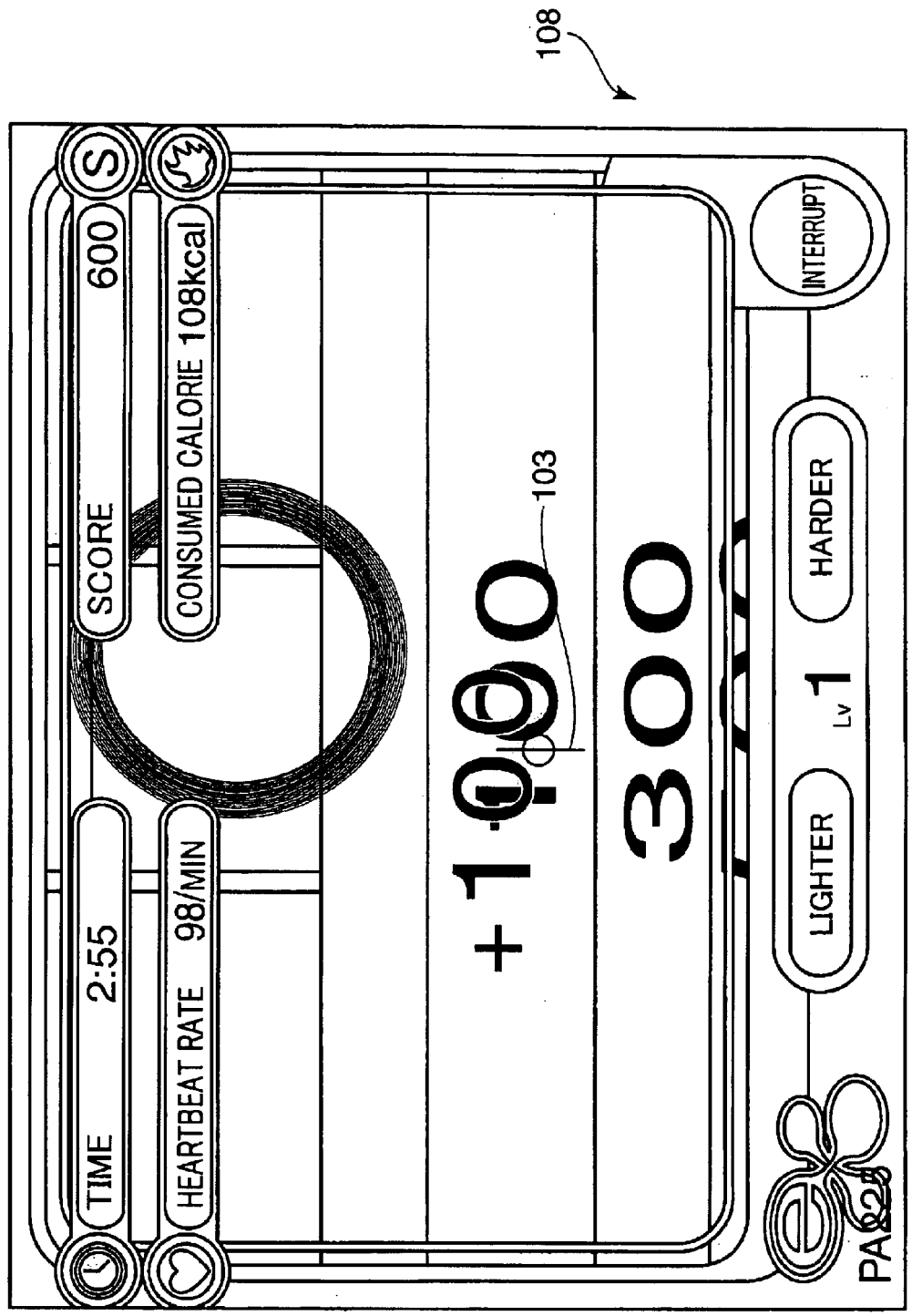
FIG. 19 is a diagram of a screen displayed when a position of landing is within a zone of 100 points.

FIGS. 18 and 19 both shows images displayed at the time of landing. In FIG. 18, the landing position is located within the zone of 300 pts., and a character "+300" as points to be given appears on the screen. In FIG. 19, the landing position is located within the zone of 100 pts., and a character "+100" as points to be given appears on the screen. The game executing unit 33 causes the cycling machine character 103 to run along the jumping platform according to the pedal rotating speed and the position (running distance) of the user and to jump at the top of the jumping platform, and instructs the landing at a specified position. The game evaluating unit 34 adds the given score to the current score and renews the value of the score in a score display column on the upper-right side of the screen.

Specifically, if the running speed corresponding to the pulse rate detected by the pulse monitoring device 301 coincides with the running speed corresponding to the preset target pulse rate at the top position of the jumping platform immediately before the jump, landing is made within the zone of 1000 pts. An instruction is given to set the landing position within the zone of 500 pts, 300 pts. or 100 pts. according to the difference between the detected pulse rate and the target pulse rate. This means that, even if the pedals 11b are turned quickly to earn a longer jumping distance, i.e. to jump farther, a high score is not necessarily given. The training and the purpose meet in the point of aiming to maintain a suitable exercising state throughout the training (exercise). A relationship between the difference between the detected pulse rate and the target pulse rate and the score may be prepared in a table format beforehand, and the display of the landing position may be instructed based on the difference information immediately before the jump.

One specified parabola prepared beforehand is described as a jumping trace. If such a display control is made as to switch the screen and change only the landing position, it is not necessary to calculate the jumping trace and, therefore, the jump can be displayed by a simple method.

Figure 20:
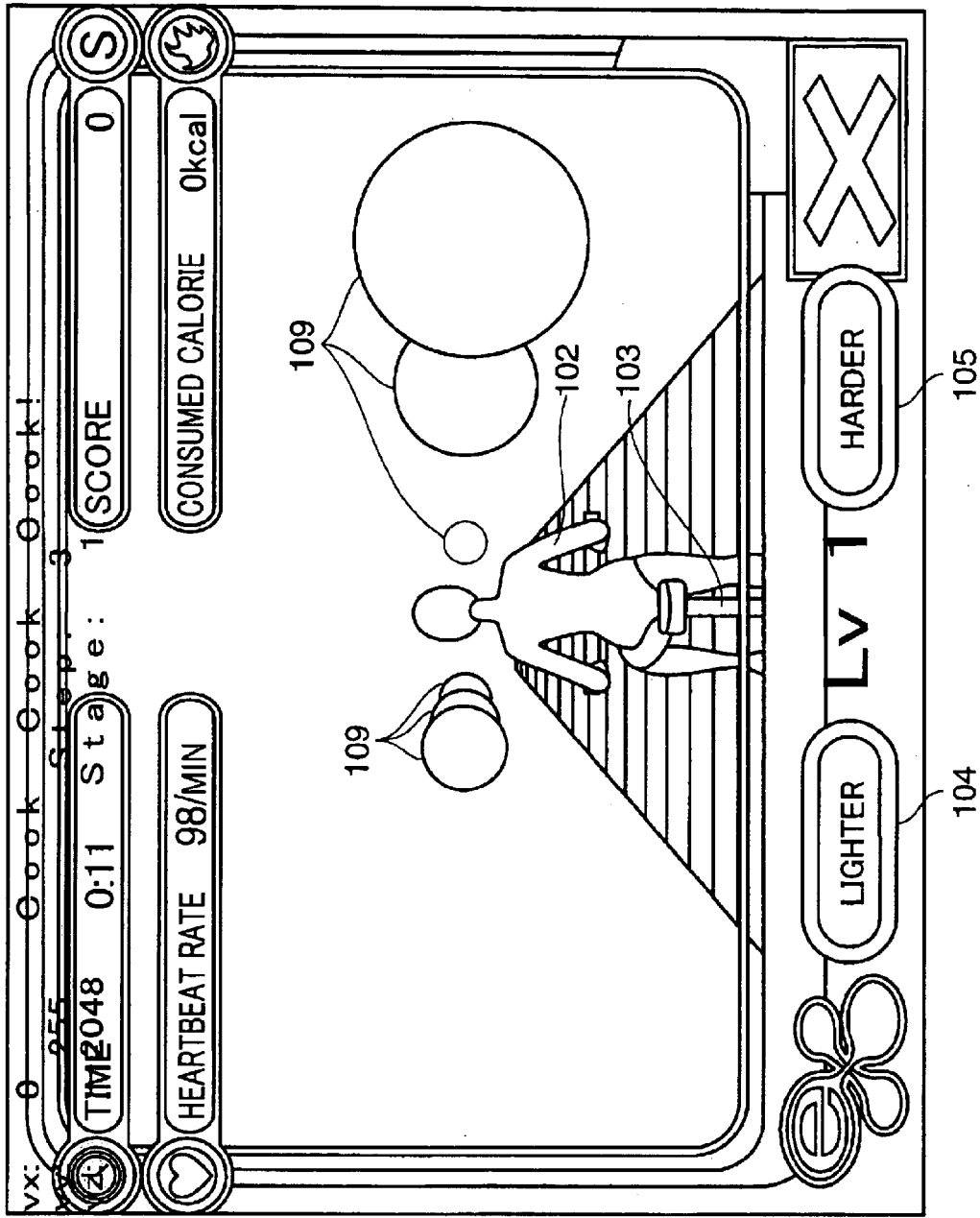
FIG. 20 is a diagram of a screen showing another exemplary game.

FIG. 20 shows a screen displaying another exemplary game. The game executing unit 33 switches the exercise screen to the one in which only the running road is displayed as a background image at a suitable timing. Balloon characters 109 as items are displayed, for example, at the left and right sides of the running road while being suitably arranged in the running direction (see FIG. 16). When the user suitably presses the buttons 17a, 17b, the game executing unit 33 changing the running direction of the cycling machine character 103 to collide with the respective balloon characters 109. Upon collision, the game executing unit 33 instructs such an imaging processing as to tear the balloon character 109 and the game evaluating unit 34 increases the score.

Next, a procedure of the exercise assistance is described with reference to flow charts.

Figure 21:
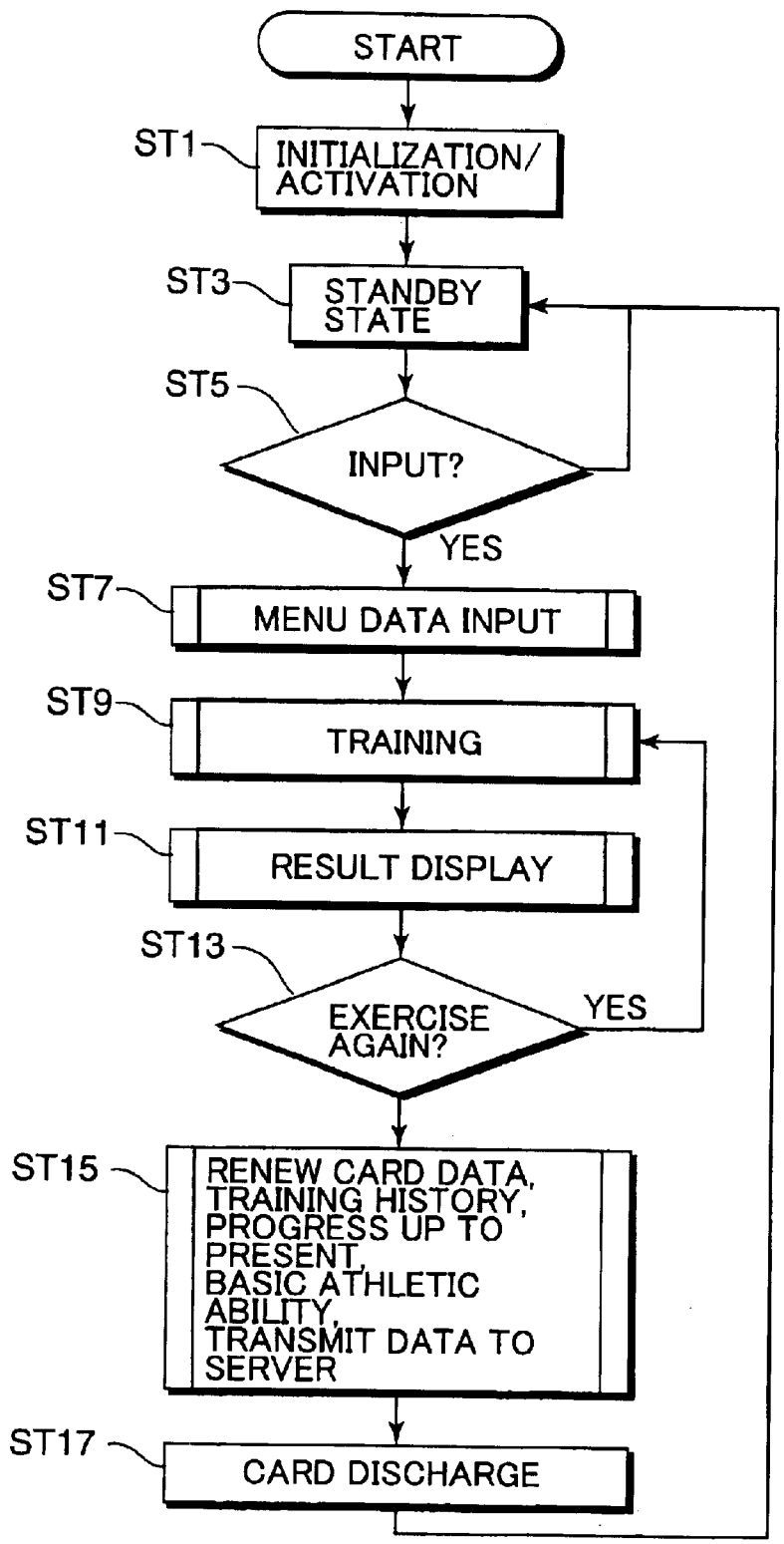
FIG. 21 is a main flow chart showing a procedure of exercise assistance.

FIG. 21 is a main flow chart. The cycling machine is first activated by being turned on and the initialization is performed (Step ST1). Subsequently, a standby state is entered (Step ST3) and it is discriminated whether any input has been made, e.g. a specific button on the operation panel 17 has been pressed (Step ST5). Upon an input, a subroutine "Menu Data Input" is executed (Step ST7). Then, the training by the user is started and a subroutine "Training" including the monitoring of the exercise at this time is executed (Step ST9). When one training is completed or interrupted, a subroutine "Result Display" is executed (Step ST11). It is then questioned whether or not the training is to be done again (Step ST13). Step ST9 follows when the user presses the "YES" button on the screen, i.e. upon the receipt of the user's will to do the training again. Unless otherwise, Step ST15 follows and the individual card 18 is permitted to be ejected or automatically ejected (Step ST17) after a specified end processing is executed.

The specified end processing is executed by the data administering device 307 and includes renewal of the data in the individual card 18, i.e. renewal of the training history, renewal of the progress up to the present, renewal of the basic athletic ability, and transmission of the renewed data to the administration server which is performed if the network communication unit 7 requires.

Figure 22:
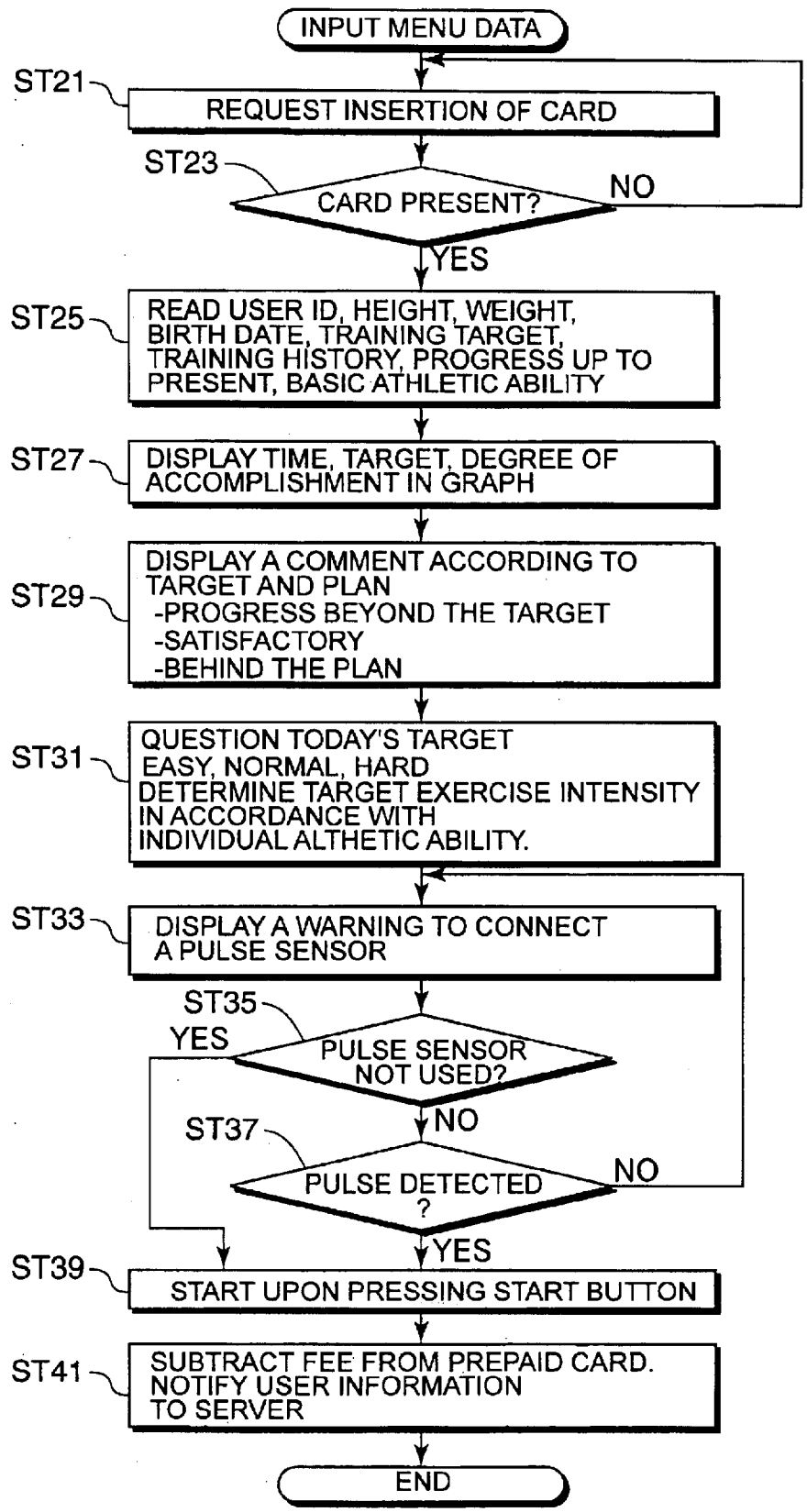
FIG. 22 is a flow chart showing a subroutine "Menu Data Input"

FIG. 22 is a flow chart showing the subroutine "Menu Data Input". First, a screen requesting the insertion of the individual card 18 is displayed (Step ST21). When the individual card 18 is inserted into the card reader 18a (YES in Step ST23), the individual data are read from the individual card 18 and the entry guide screens shown in FIGS. 4 to 6 and unillustrated entry guide screens are displayed for the data entry (Step ST25). Various data include the ID, height, weight and birth date of the user, the training target (course), the training history, the progress up to the present, and the basic athletic ability value. Based on these data, the consumed calorie is calculated and the history information up to the present for the target is obtained.

Upon the completion of the entry of various data, an exercise time spent thus far (a total sum in the case that a plurality of kinds of exercising equipments are used), the target (for example, reduction of) (kg in the case of a diet), a degree of accomplishment (based on a total sum in the case that a plurality of kinds of exercising equipments are used) are displayed in a graph (Step ST27). This graph is a line graph in which horizontal and vertical axes represent time and target, respectively and a curve approaches the target as time passes. Subsequently, a comment corresponding to the displayed target and plan is displayed. The plan shows whether the line graph is located above (higher than planned) or not (lower than planned) a target line at present. According to this result, a message "Progress beyond the target", "Satisfactory" or "Behind the Plan" is displayed (Step ST29). The line graph may be displayed for each of the exercising equipments.

Subsequently, a screen is displayed to question what the target for today's exercise, and the entry of "Easy", "Normal" or "Hard" is selectably received. A target exercise intensity is determined based on the received content and the read individual athletic ability (Step ST31). The target exercise intensity is comprised of the target pulse rate and the running distance or running time.

Upon the completion of various inputs, a warning is displayed (notified) to urge the user to put the pulse sensor 19 on (Step ST33). Here, if the user desires not to put the pulse sensor 19 on, Step ST39 follows after receiving an input that the pulse sensor 19 is not used, for example, at the time of selecting the training course. If the user desired to put the pulse sensor 19 on, it is discriminated whether or not any detection signal has been outputted from the pulse sensor 19 (Step ST35). Step ST39 follows if the pulse rate has been detected. Unless otherwise, the warning is displayed to urge the user to put the pulse sensor 19 on after returning to Step ST33.

Subsequently, the screen shown in FIG. 7 is displayed to wait until the start button is pressed, and the main processing is started (Step ST39) when the start button is pressed. Upon the start of the main processing, a specified number of points are subtracted from the individual card 18 which is a prepaid card, and the use information is notified to the administration server via the network communication unit 7. Besides the above payment method, various other payment methods, for example, including cash payment and monthly payment can be adopted.

Figure 23:
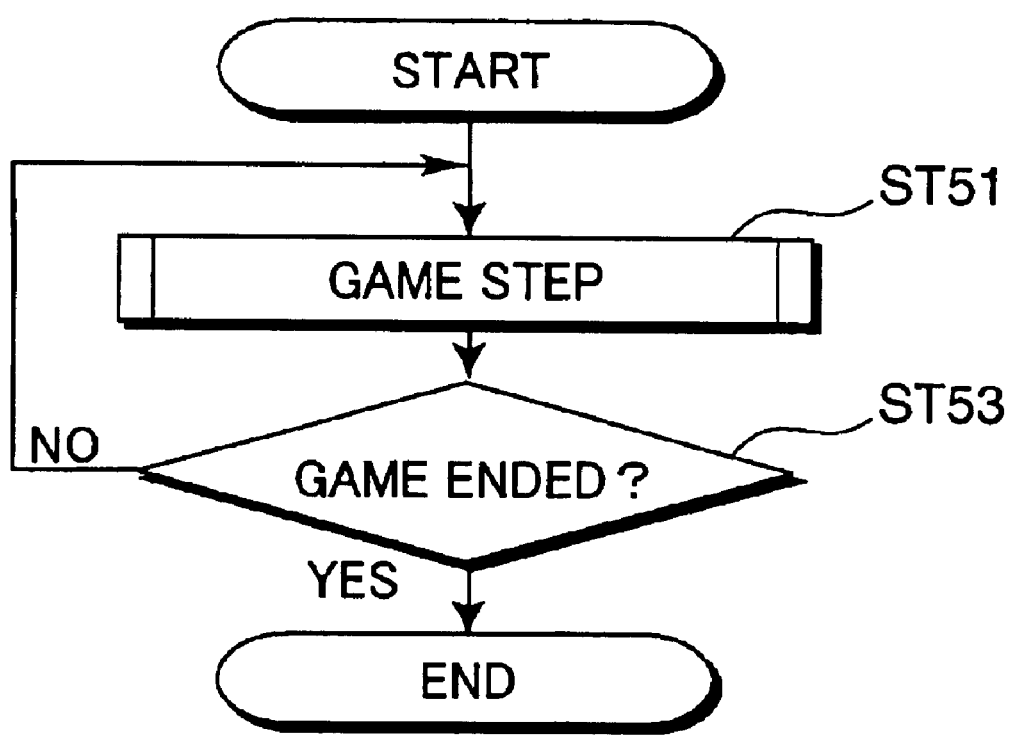
FIG. 23 is a flow chart showing a subroutine "Training"

FIG. 23 is a flow chart showing the subroutine "Training". A subroutine "Game Step" is executed (Step ST51) and it is discriminated whether the game is to be ended or to be played again (Step ST53). The subroutine "Game Step" follows if the game is to be played again, and this subroutine "Training" ends unless otherwise.

Figure 24:
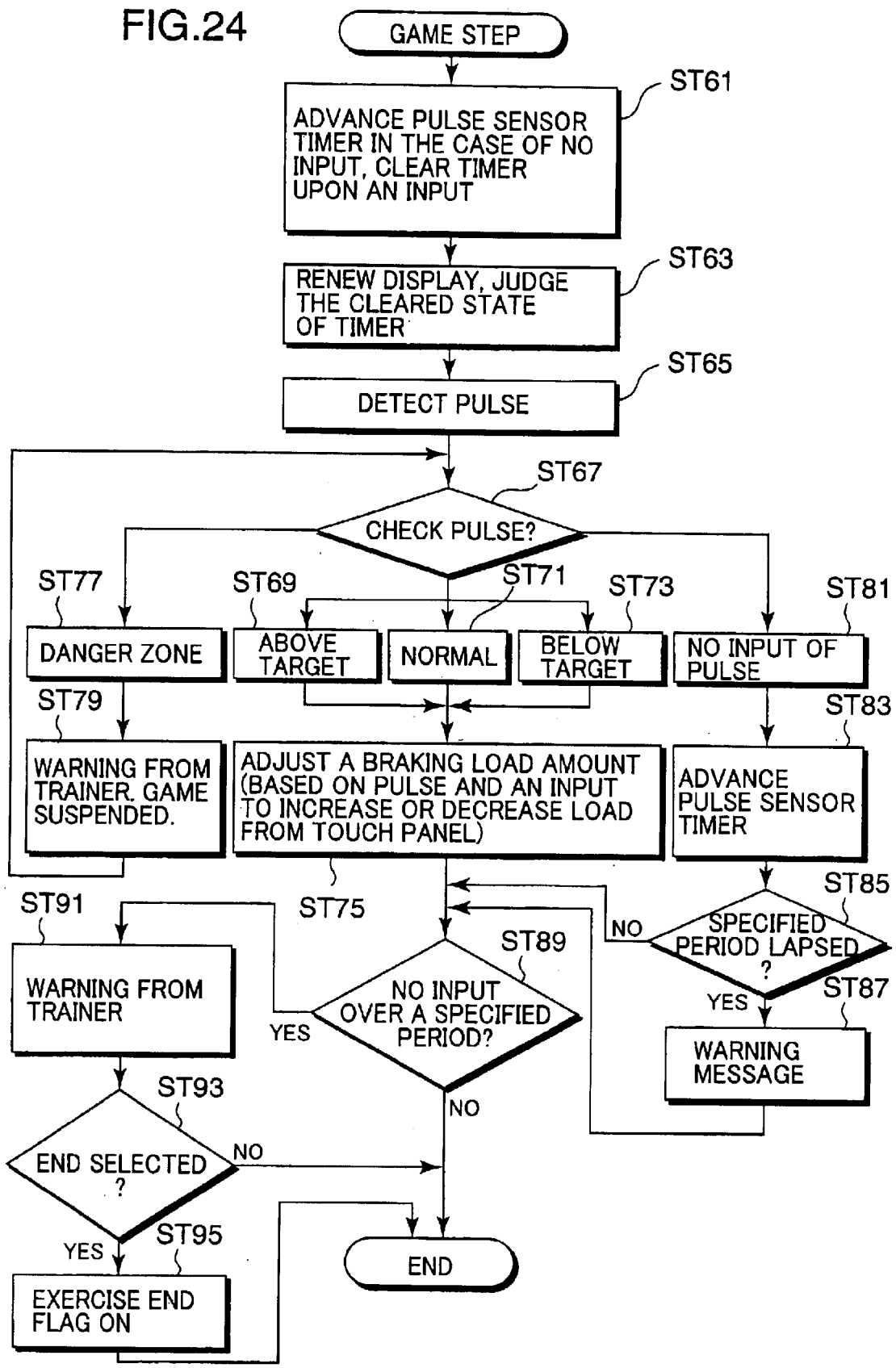
FIG. 24 is a flaw chart showing a subroutine "Game Step"

FIG. 24 is a flow chart showing the subroutine "Game Step". First, the pulse sensor timer is cleared if the pulse has been inputted (Step ST61) and the display information is renewed and it is discriminated whether or not the pulse sensor timer has been cleared in Step ST61 (Step ST63). In other words, the display information for the imaging is generated and prepared every time by renewing the data of the respective characters 101 to 103 and the background image for one unit time (?).

Subsequently, the pulse rate is detected by the pulse monitoring device 301 (Step ST65) and the detected pulse rate is checked in relation to the target pulse rate (Step ST67). In other words, it is judged whether the detected pulse rate is above the target pulse rate (Step ST69), normal (substantially equal to the target pulse rate) (Step ST71) or below the target pulse rate (Step ST73). The load controlling device 305 outputs a command signal to reduce the load condition of the electromagnetic brake 12b by one stage if the detected pulse rate is above the target pulse rate, maintains the present load condition if it is normal (substantially equal to the target pulse rate), and outputs a command signal to increase the load condition of the electromagnetic brake 12a by one stage (Step ST75), thereby balancing the exercise and the load.

On the other hand, if the detected pulse rate exceeds an threshold value (upper limit value) set beforehand as a danger zone (Step ST77), a message "Game Suspended" is displayed as a warning, for example, while displaying the trainer character 101 on the monitor 14 (Step ST79). Conversely, if there is no input of the pulse (Step ST81), the pulse sensor timer is advanced only by one (Step ST83) and then it is discriminated whether the pulse sensor timer has measured a specified period (Step ST85). Step ST89 follows if the specified period is not yet up, whereas a warning message saying that the pulse sensor 19 is off is displayed (Step ST87) if the specified period has already lapsed.

In Step ST89, it is discriminated whether no input has been made from the rotation sensor 11c for a specified continues period because the user left the cycling machine or interrupted the game. If the specified period is not yet up, Step ST53 follows by escaping this subroutine. On the other hand, if the specified period has already lapsed, a message saying that no input has been made is displayed while displaying the trainer character 101 on the monitor 14. This routine is escaped after turning an exercise end flag on when no input has been detected even after the lapse of a set period or the end of the game is selected.

Figure 25:
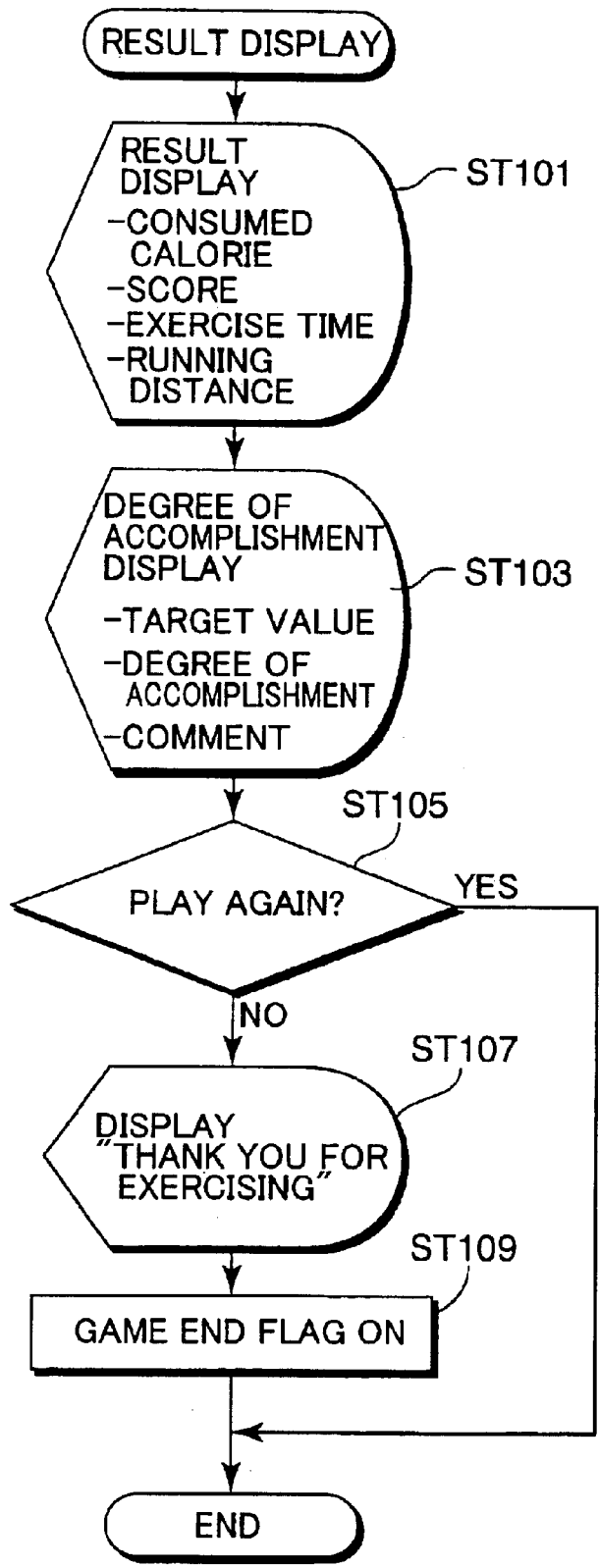
FIG. 25 is a flow chart showing a subroutine "Result Display"

FIG. 25 is a flow chart showing the subroutine "Result Display". First, "Exercise Time", "Running Distance", "Score" and "Consumed Calorie" are displayed as shown in FIG. 13 and then the degree of target accomplishment is displayed in the contents of "Target Value", "Degree of Accomplishment" and "Comment" (Step ST103). Whether the exercise is to be done again is questioned in the form of the selection of "YES" and "NO" (Step ST105). If "YES" is selected, this routine is escaped. If "NO" is selected, the exercise end flag is turned on after the screen of FIG. 14 and this routine is escaped (Steps ST107. ST109).

FIG. 26 is a perspective view showing other examples of exercising equipments to which the present invention is applied.

Figures 26A, 26B, 26C, 26D:
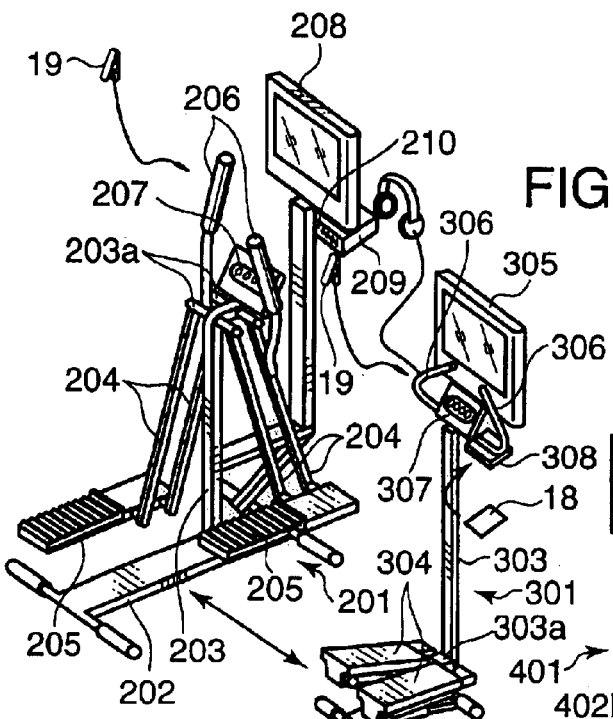
FIGS. 26A, 26B, 26C and 26D are perspective diagrams showing other examples of the exercising equipments to which the invention is applied.

FIG. 26A is a diagram showing the external configuration of a walking machine 201. In this walking machine 201, transversely extending rotary shafts 203a are rotatably supported at the upper end of a support 203 standing at a center position of an H-shaped bottom base 202 slightly closer to the front end, two pivotal arms 204 extend down from the left and right ends of each rotary shaft 203a, and foot rests 205 are mounted at the bottom parts of the pivotal arms 204. One of the two pivotal arms 204 is rotatable with respect to the support 203, and the bottom end of the other arm is horizontally slidable with respect to the corresponding foot rest 205. Thus, the foot rests 205 are alternately slidable forward and backward in opposite directions while being horizontally held. Grips 206 extend from the upper ends of the left and right pivotal arms 204. An operation panel 207 is provided on the upper end of the support 203, and a monitor 208 is installed at the front side of the walking machine 201. A card reader 209 for the individual card 18 and an insertion slot 210 for the lead wire of the pulse sensor 19 are provided at specified positions below the monitor 208. The user can simulate walking by moving the pivotal arms 204 forward and backward while placing both feet on the foot rests 205. Although not shown, a load condition changing member such as an electromagnetic clutch is provided on the rotary shaft 203a at the upper end of the pivotal arms 204. Further, a pivot sensor corresponding to the rotation sensor 11c of FIG. 1 such as a rotary encoder for detecting the forward and reverse pivotal movements of the rotary shaft 203a by a specified angle is provided near the load condition changing member. A control program for the walking machine 201 is substantially the same as the one used for the cycling machine of FIG. 1 except the part reflecting differences between this walking machine 201 and the cycling machine of FIG. 1. A role-playing character is displayed on the monitor 208 to walk or run.

FIG. 26B is similarly a diagram showing the external configuration of a walking machine 301. In this walking machine 301, a transversely extending rotary shaft 303a is rotatably supported at the bottom of a support 33 standing at the front end of an H-shaped bottom base 302, and a pair of foot rests 304 which can be alternately pivoted in opposite directions are mounted at the left and right sides of the rotary shaft 303a. Further, a monitor 305 and grips 306 are provided at the upper end of the support 303. An operation panel 307 is provided near the upper end of the support 305. A card reader 308 for the individual card 18 and an insertion slot (not shown) for the lead wire of the pulse sensor 19 are provided at specified positions below the operation panel 307. The user can simulate walking by moving the foot rests 205 upward and downward while placing both feet on the foot rests 205. Although not shown, a load condition changing member such as an electromagnetic clutch is provided on the rotary shaft 303a. Further, a pivot sensor corresponding to the rotation sensor 11c of FIG. 1 such as a rotary encoder for detecting the forward and reverse pivotal movements of the rotary shaft 303a by a specified angle is provided near the load condition changing member. A control program for the walking machine 301 is substantially the same as the one used for the cycling machine of FIG. 1 except the part reflecting differences between the walking machine 301 and the cycling machine of FIG. 1. A role-playing character is displayed on the monitor 305 to walk or run.

FIG. 26C is similarly a diagram showing the external configuration of a walking machine 401. In this walking machine 401, a support 403 stands at the front end of a mat-shaped floor element 402, and a monitor 404, a card reader 405 for the individual card 18, and an insertion slot (not shown) for the lead wire of the pulse sensor 19 are mounted at the upper end of the support 403. Marks 402a representing left and right stepping areas are written on the floor element 402, and switches for detecting the pressed state by the weight are embedded below the marks 402a. Marks 402b corresponding to the respective buttons of the operation panel are written before the marks 402a, and switches are embedded below these marks 402b. No load condition changing member is provided in this machine. A control program for the walking machine 401 is substantially the same as the one used for the cycling machine of FIG. 1 except the part reflecting differences between the walking machine 401 and the cycling machine of FIG. 1 and the absence of the load variation. A role-playing character is displayed on the monitor 404 to walk or run.

FIG. 26D is similarly a diagram showing the external configuration of a walking machine 501. In this walking machine 501, a rotatable endless belt 502 inclined down to the back is so held by left and right guides 503 as to turn. A grip frame 504 surrounding the front side of the endless belt 502 is provided at the front end of the endless belt 502, and an operation panel 505, a monitor 506, a card reader 507 for the individual card 18 and an insertion slot (not shown) for the lead wire of the pulse sensor 19 are mounted on the upper part of the grip frame 504. Although not shown, a load condition changing member such as an electromagnetic clutch for varying the load of the turning movement of the endless belt 502 is provided at a suitable position between the opposite guides 503, and a moved amount detecting sensor corresponding to the rotation sensor 11c of FIG. 1 and adapted to detect the turned amount of the endless belt 502 is provided at a suitable position between the opposite guides 503. A control program for the walking machine 501 is substantially the same as the one used for the cycling machine of FIG. 1 except the part reflecting differences between the walking machine 501 and the cycling machine of FIG. 1. A role-playing character is displayed on the monitor 506 to walk or run.

According to this embodiment, in the jump game shown in FIGS. 16 to 19, the character is caused to make the specified motion belonging to the simulated exercise made using the cycling machine, and a higher evaluation is given as the specified motion is made in a state closer to the one corresponding to the target pulse rate set beforehand. However, the present invention is not limited to the application to the jump game and can be applied to various games in which a higher evaluation is given as the specified motion is made in a state closer to the one corresponding to the target pulse rate set beforehand. For example, in the game of tearing the balloon characters 109 shown in FIG. 20, a higher evaluation may be given when the balloon character 109 is torn while the cycling machine character 103 is moved at the speed closer to the one attained at the target pulse rate set beforehand. Further, by adopting a game in which a certain competition is additionally made while the cycling machine character 103 is moved at the speed closer to the one attained at the target pulse rate set beforehand, such an assistance as to urge the user to actively maintain a proper exercising state or a state closer to his target can be made besides presenting such a feeling of experience that images are merely changed to move within the background image.

In summary, this invention takes a form of an exercise assisting apparatus, said apparatus comprising: an exercise equipment having a movable portion for causing a user to exercise on a specified load condition, exercise detecting means for detecting a movement of the movable portion of the exercising equipment, pulse rate detecting means for detecting the pulse rate of the user, exercise monitoring means for monitoring an exercising state of the user in accordance with the detection results of the exercise detecting means and the pulse rate detecting means, a monitor provided on the exercising equipment for displaying a background image and a character corresponding to the user, image displaying means for causing the character to make a simulated motion related to the exercise within the background image on a screen of the monitor in accordance with the detection result of the exercise detecting means, game executing means for causing the character to make a specified motion belonging to the simulated exercise, and game evaluating means for giving a higher evaluation as the executed specified motion is made in a state closer to the one corresponding to a target pulse rate set beforehand.

The present invention also takes a form of an exercise assisting method using an exercise assisting apparatus including an exercising equipment with a movable portion and a monitor to display a background image for letting a user to exercise on a specified load condition. The method comprising the steps of:

(a) detecting a movement of the movable portion of the exercising equipment and a pulse rate of the user, (b) monitoring an exercising state of the user in accordance with these detection results, (c) causing a character corresponding to the user to make a simulated motion related to the exercise within the background image displayed on the monitor screen in accordance with the detected exercising state, (d) causing the character to make a specified game motion belong to the simulated exercise, and (e) giving a higher evaluation as the executed specified game motion is made in a state closer to the one corresponding to a target pulse rate set beforehand.

With the above exercise assisting apparatus and method, if the user exercises using the movable portion of the exercising equipment, such a movement is detected by the exercise detecting means and the pulse rate of the user at that time is detected. The exercise monitoring means monitors the exercising state of the user in accordance with the detection results of the exercise detecting means and the pulse rate detecting means. For example, the exercise monitoring means calculates a consumed calorie, judges whether the user is exercising in a suitable, excessive or light load condition, and notifies the judgment result to the user if necessary. On the other hand, the character corresponding to the user is displayed together with the background image on the monitor screen, and the character is caused to make the simulated motion related to the exercise within the background image in accordance with the detection result of the exercise detecting means. At this time, the character on the monitor screen is caused to make the specified motion belonging to the simulated exercise by the game executing means. The game evaluating means gives a higher evaluation as the executed specified motion is made in a state closer to the one corresponding to a target pulse rate set beforehand. Thus, the user is led to such a psychological state or driven to have such a will as to aim to do a specified exercise at the target pulse rate set beforehand (preferably, aerobic exercise, etc.) in order to obtain a higher evaluation. Consequently, the exercise can be assisted while a preferable exercising state is maintained.

As described above, according to the present invention, the user is led to such a psychological state or driven to have such a will as to aim to do a specified exercise at the target pulse rate set beforehand (preferably, aerobic exercise, etc.) in order to get a higher evaluation. Consequently, the exercise can be assisted while a preferable exercising state is maintained.

In the aforementioned assisting apparatus, the exercising equipment may be a stationary cycling machine provided with pedals as the movable portion, the exercise detecting means detects a rotating speed of the pedals, the game executing means causes the character to jump from a jumping platform displayed in the background image by a jumping distance corresponding to the rotating speed detected by the exercise detecting means as the specified motion, and the game evaluating means may give a score corresponding to a difference between a landing position after the jump and the jumping distance at the rotation speed of the pedals when the pulse rate is the target pulse rate.

With this construction, the speed at which the pedals are turned, i.e. the rotating speed of the pedals is related to the change in the background image on the monitor screen. When the jumping platform is displayed as the background image and a jumping motion is made on this background image, the jump is ended with a jumping distance corresponding to the rotating speed of the pedals. Then, an evaluation corresponding to a landing position is given. A higher score is given as the landing position is closer to a position reached by the jumping distance corresponding to the rotating speed of the pedals at the target pulse rate.

In the aforementioned assisting apparatus, the exercise monitoring means may include a trainer displaying means for displaying a trainer character on the monitor and a message displaying means for displaying a message corresponding to a difference between the target pulse rate of the user and the pulse rate detected by the pulse rate detecting means.

With this construction, the exercise can be maintained in a preferable exercising state since the message corresponding to the difference between the target pulse rate of the user and the pulse rate detected by the pulse rate detecting means is given from the trainer character.

Moreover, the aforementioned assisting apparatus may further comprise a load condition changing means for changing the load condition of the movable portion, wherein the exercise monitoring means instructs the load condition changing means to switch the load condition so as to reduce a difference between the target pulse rate of the user and the pulse rate detected by the pulse rate detecting means according to said difference.

With this construction, a reasonable exercising state can be automatically set since the load condition is switched to reduce the difference between the target pulse rate of the user and the pulse rate detected by the pulse rate detecting means. Furthermore, the exercise can be done in a reasonable state since the load condition is automatically switched to reduce the difference between the target pulse rate of the user and the pulse rate detected by the pulse rate detecting means.

Furthermore, the aforementioned assisting apparatus may further comprise a load condition changing means for changing the load condition of the movable portion, wherein the exercise monitoring means instructs the load condition changing means to switch the load condition so as to reduce a difference between the target pulse rate of the user and the pulse rate detected by the pulse rate detecting means according to said difference, and the message displaying means gives a corresponding warning message when the difference between the target pulse rate of the user and the pulse rate detected by the pulse rate detecting means exceeds a specified threshold value.

With this construction, a corresponding warning message is notified to the user, for example, when the difference between the target pulse rate of the user and the pulse rate detected by the pulse rate detecting means reaches the threshold value even though the load condition is switched to reduce this difference by the load condition changing means.

In the aforementioned assisting apparatus, the exercise monitoring means may include a notifying means for giving a notification if the exercise detecting means has not detected the movement of the movable portion for a specified continuous period.

With this construction, the exercise is judged to have been interrupted or ended when the movement of the movable portion has not been detected for the specified continuous period, and a corresponding notification is made to let the user to deal with such a state. Further, by notifying the user upon judging the end or interruption of the exercise to let him react to it, passage of a waiting time in vain can be eliminated, improving the operation efficiency of the exercising equipment.

This application is based on Japanese patent application serial no. 2001-304332 filed in Japan Patent Office on Sep. 28, 2001, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An exercise assisting apparatus, comprising:

exercise equipment having a movable portion for allowing a user to exercise under a specified load condition, exercise detecting means for detecting a movement of the movable portion of the exercising equipment, pulse rate detecting means for detecting the pulse rate of the user, exercise monitoring means for monitoring an exercising state of the user in accordance with the detection results of the exercise detecting means and the pulse rate detecting means, a monitor arranged in connection with the exercising equipment for displaying a background image and a character corresponding to the user on a screen, image displaying means for causing the character to make a simulated motion related to the exercise within the background image on the screen of the monitor in accordance with the detection result of the exercise detecting means, game executing means for causing the character to make a specified motion related to the simulated exercise based on the detection results of the exercise detecting means, and game evaluating means for giving a higher evaluation when the executed specified motion is made in a state in which the pulse rate of the user is closer to a preset target pulse rate.

2. An exercise assisting apparatus according to claim 1, wherein:

the exercising equipment is a stationary cycling machine provided with pedals as the movable portion, the exercise detecting means detects a rotating speed of the pedals, the game executing means causes the character to jump from a jumping platform displayed in the background image by a jumping distance corresponding to the rotating speed detected by the exercise detecting means such that the jump is the specified motion, and the game evaluating means gives a score corresponding to a difference between a landing position after the jump and the jumping distance at the rotation speed of the pedals when the pulse rate is the target pulse rate.

3. An exercise assisting apparatus according to claim 1, wherein the exercise monitoring means includes trainer displaying means for displaying a trainer character on the monitor and message displaying means for displaying a message corresponding to a difference between the target pulse rate of the user and the pulse rate detected by the pulse rate detecting means.

4. An exercise assisting apparatus according to claim 1, further comprising load condition changing means for changing the load condition of the movable portion, wherein the exercise monitoring means instructs the load condition changing means to switch the load condition so as to reduce a difference between the target pulse rate of the user and the pulse rate detected by the pulse rate detecting means according to said difference.

5. An exercise assisting apparatus according to claim 3, further comprising load condition changing means for changing the load condition of the movable portion, wherein the exercise monitoring means instructs the load condition changing means to switch the load condition so as to reduce a difference between the target pulse rate of the user and the pulse rate detected by the pulse rate detecting means according to said difference, and the message displaying means gives a corresponding warning message when the difference between the target pulse rate of the user and the pulse rate detected by the pulse rate detecting means exceeds a specified threshold value.

6. An exercise assisting apparatus according to claim 1, wherein the exercise monitoring means includes notifying means for giving a notification when the exercise detecting means has not detected the movement of the movable portion for a specified continuous period.

7. An exercise assisting method using an exercise assisting apparatus including exercising equipment with a movable portion and a monitor to display a background image allowing a user to exercise under a specified load condition, said method comprising the steps of:

(a) detecting movement of the movable portion of the exercising equipment and a pulse rate of the user, (b) monitoring an exercising state of the user in accordance with the detection results, (c) causing a character corresponding to the user to make a simulated motion related to the exercise within the background image displayed on the monitor in accordance with the detected exercising state, (d) causing the character to make a specified game motion related to the simulated exercise based on the detection results, and (e) giving a higher evaluation as the executed specified game motion is made in a state in which the pulse rate of the user is closer to a preset target pulse rate.

8. The method according to claim 7, wherein said exercising equipment is a stationary cycling machine provided with pedals as the movable portion, a rotating speed of the pedals is detected in step (a), the character is caused to jump, as the specified motion, from a jumping platform displayed in the background image by a jumping distance corresponding to the detected rotating speed in step (d), and a score corresponding to a difference between a landing position after the jump and the jumping distance at the rotation speed of the pedals is given when the pulse rate is the target pulse rate in step (e).

9. The method according to claim 7, further comprising the steps step of:

displaying on the monitor a trainer character and a message corresponding to a difference between the target pulse rate of the user and the pulse rate of the user.

10. The method according to claim 7, further comprising the steps of:

changing the load condition of the movable portion, and giving an instruction to switch the load condition so as to reduce a difference between the target pulse rate of the user and the pulse rate detected in step (b).

11. The method according to claim 7, further comprising the steps of:

changing the load condition of the movable portion, giving an instruction to switch the load condition so as to reduce a difference between the target pulse rate of the user and the pulse rate detected in step (b), and giving a corresponding warning message when the difference between the target pulse rate of the user and the pulse rate detected in step (b) exceeds a specified threshold value.

12. The method according to claim 7, further comprising providing a notification in step (b) when the movement of the movable portion is not detected for a specified continuous period in step (a).

13. An exercise assisting apparatus according to claim 1, wherein the exercise is pedaling and the specified motion is a jump.

14. An exercise assisting apparatus, comprising:

a stationary cycling machine having movable pedals allowing a user to exercise under a specified load condition;

exercise detecting means for detecting the rotating speed of the pedals;

pulse rate detecting means for detecting the pulse rate of the user;

exercise monitoring means for monitoring an exercise state of the user in accordance with the rotating speed of the pedals detected by said exercise detecting means and the user's pulse rate detected by said pulse rate detecting means;

a display monitor arranged in connection with said cycling machine for displaying a background image, a character corresponding to the user and at least one jumping platform;

image displaying means for causing the character to make a simulated motion related to the pedaling movement within the background image on said display monitor in accordance with the rotating speed of the pedals detected by said exercise detecting means;

game execution means for causing the character to jump from the jumping platform displayed in the background image by a jumping distance determined by the rotating speed of the pedals detected by said exercise detecting means; and game evaluation means for providing a higher evaluation when the executed specified motion is made in a state in which the pulse rate of the user is closer to a preset target pulse rate.

15. An exercise assisting apparatus, comprising:

a stationary cycling machine having a movable pedals allowing a user to exercise on a specified load condition;

exercise detecting means for detecting a rotating speed of the pedals;

pulse rate detecting means for detecting the pulse rate of the user;

exercise monitoring means for monitoring an exercise state of the user in accordance with the rotating speed of the pedals detected by said exercise detecting means and the user's pulse rate detected by said pulse rate detecting means;

a display monitor arranged in connection with said stationary cycling machine for displaying a background image, a character corresponding to the user and at least one jumping platform;

image displaying means for causing the character to make a simulated motion related to the pedaling movement within the background image on said display monitor in accordance with the rotating speed of the pedals detected by said exercise detecting means;

game execution means for causing the character to jump from a jumping platform displayed in the background image by a jumping distance corresponding to the rotating speed detected by said exercise detecting means; and game evaluation means for giving a higher evaluation when the jump from the jumping platform is made in a state in which the pulse rate detected by said pulse rate detecting means immediately before the jump is closer to one corresponding to a preset target pulse rate.

16. An exercise assisting method using an exercise assisting apparatus including a stationary cycling machine with pedals and a monitor which displays a background image for allowing a user to exercise under a specified load condition, said method comprising the steps of:

(a) detecting a rotating speed of the pedals driven by the user and a pulse rate of the user;

(b) monitoring an exercising state of the user in accordance with the detection results;

(c) causing a character corresponding to the user to make a simulated motion related to the exercise within the background image displayed on the monitor in accordance with the monitored exercising state;

(d) causing the character to make a specified game motion relating to the simulated exercise including a jump motion from a jumping platform displayed in the background image by a jumping distance corresponding to the detected rotating speed; and (e) providing a higher evaluation for the user when the jump motion from the jumping platform is made in a state in which the pulse rate detected in step (a) immediately before the jump is closer to a preset target pulse rate.

* * * * *